Dec. 9, 1952     D. G. GRISWOLD     2,620,816
BACKFLOW PREVENTION DEVICE
Filed May 21, 1945     15 Sheets-Sheet 2
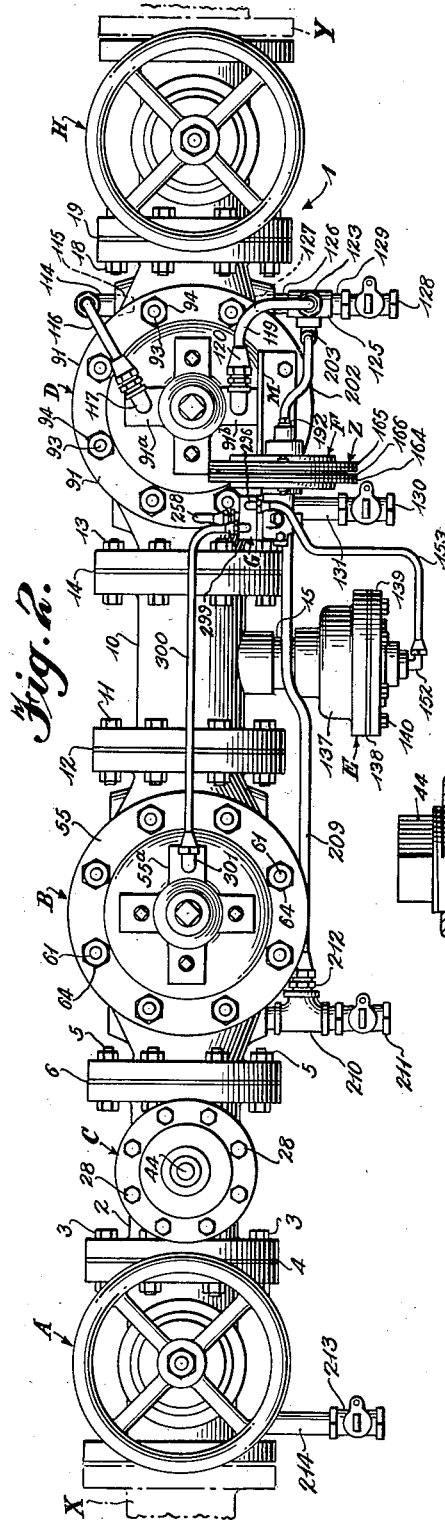
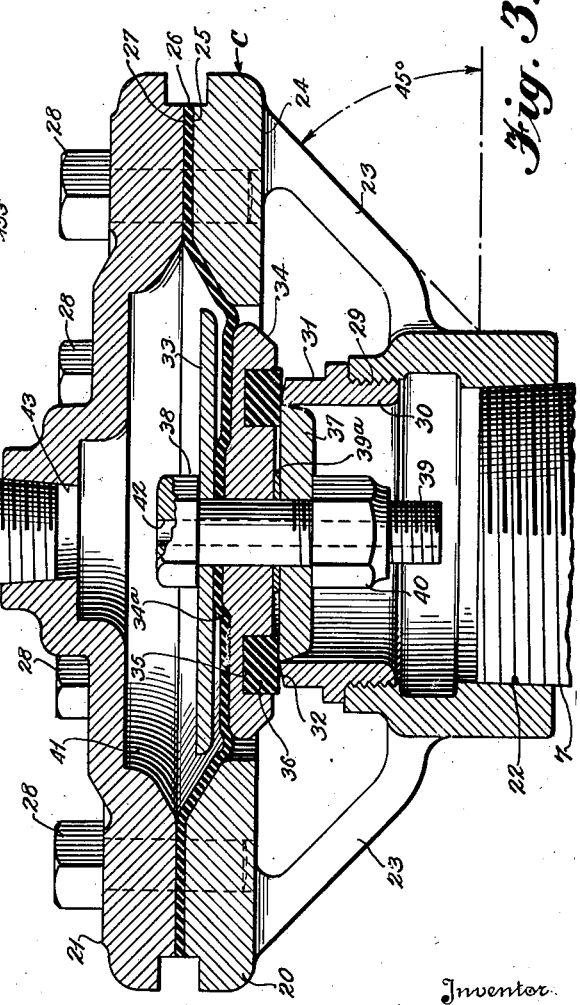
Inventor
Donald G. Griswold
By Bacon + Thomas
Attorneys Dec. 9, 1952 D. G. GRISWOLD 2,620,816
BACKFLOW PREVENTION DEVICE
Filed May 21, 1945 15 Sheets-Sheet 3

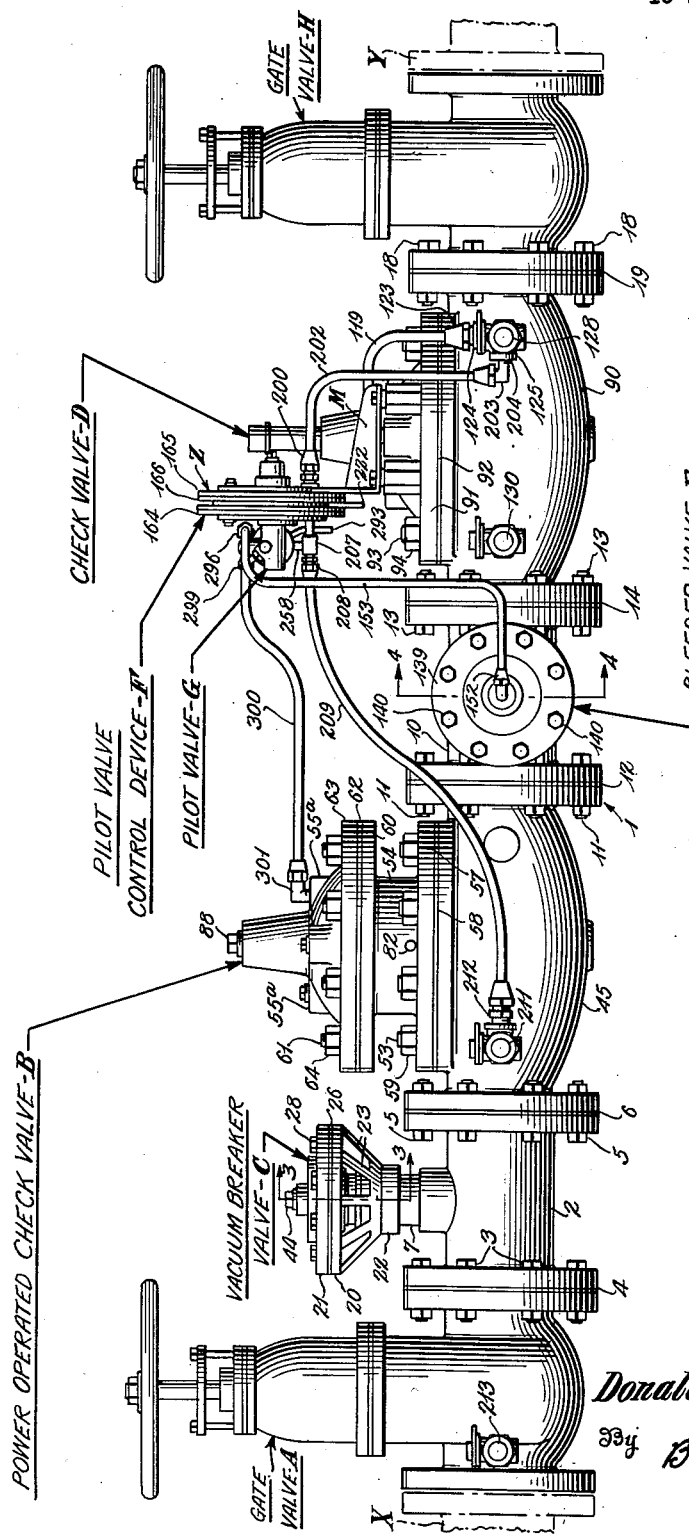

Inventor
Donald G. Griswold
By Bacon + Thomas
Attorneys

Inventor
Donald G. Griswold
By Bacon & Thomas
Attorneys

Dec. 9, 1952  D. G. GRISWOLD  2,620,816
BACKFLOW PREVENTION DEVICE
Filed May 21, 1945  15 Sheets-Sheet 5
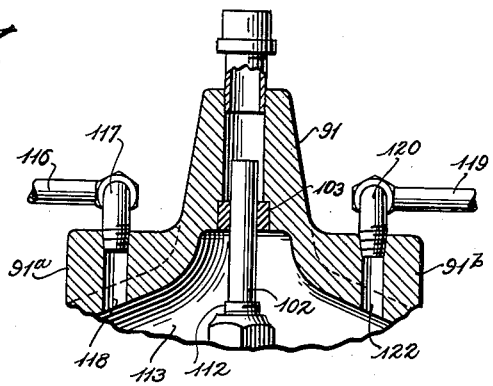
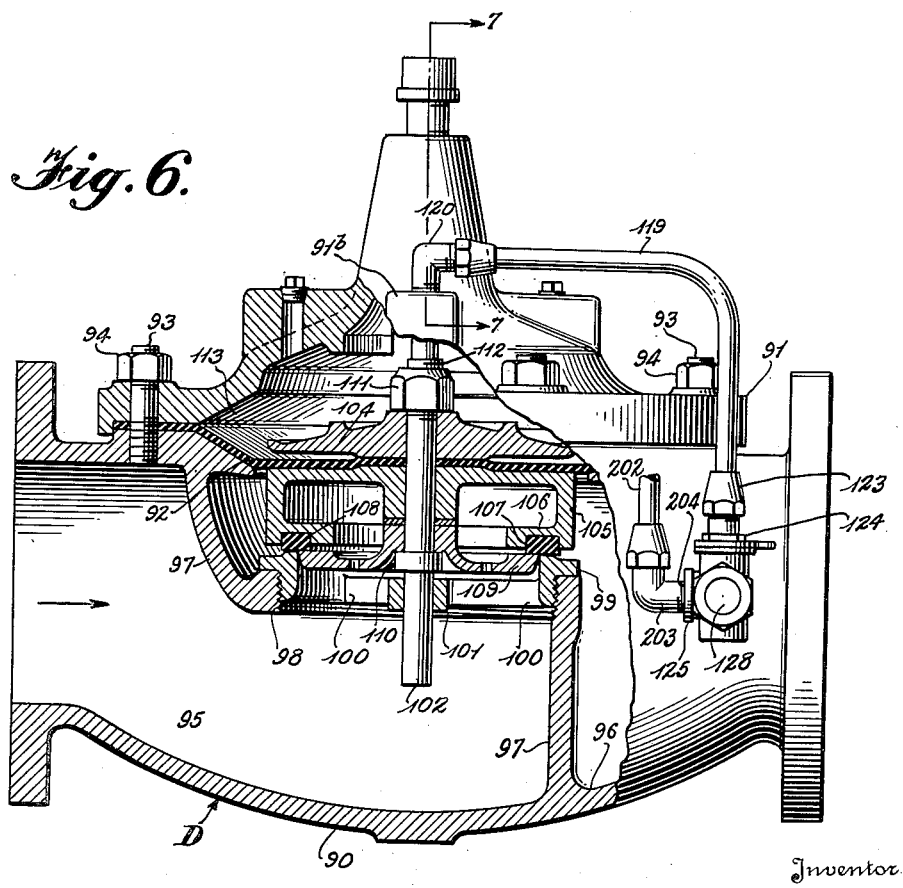
Inventor
Donald G. Griswold
By Bacon & Thomas
Attorneys Dec. 9, 1952 D. G. GRISWOLD 2,620,816
BACKFLOW PREVENTION DEVICE
Filed May 21, 1945 15 Sheets-Sheet 6

Inventor
Donald G. Griswold
By Bacon + Thomas
Attorneys

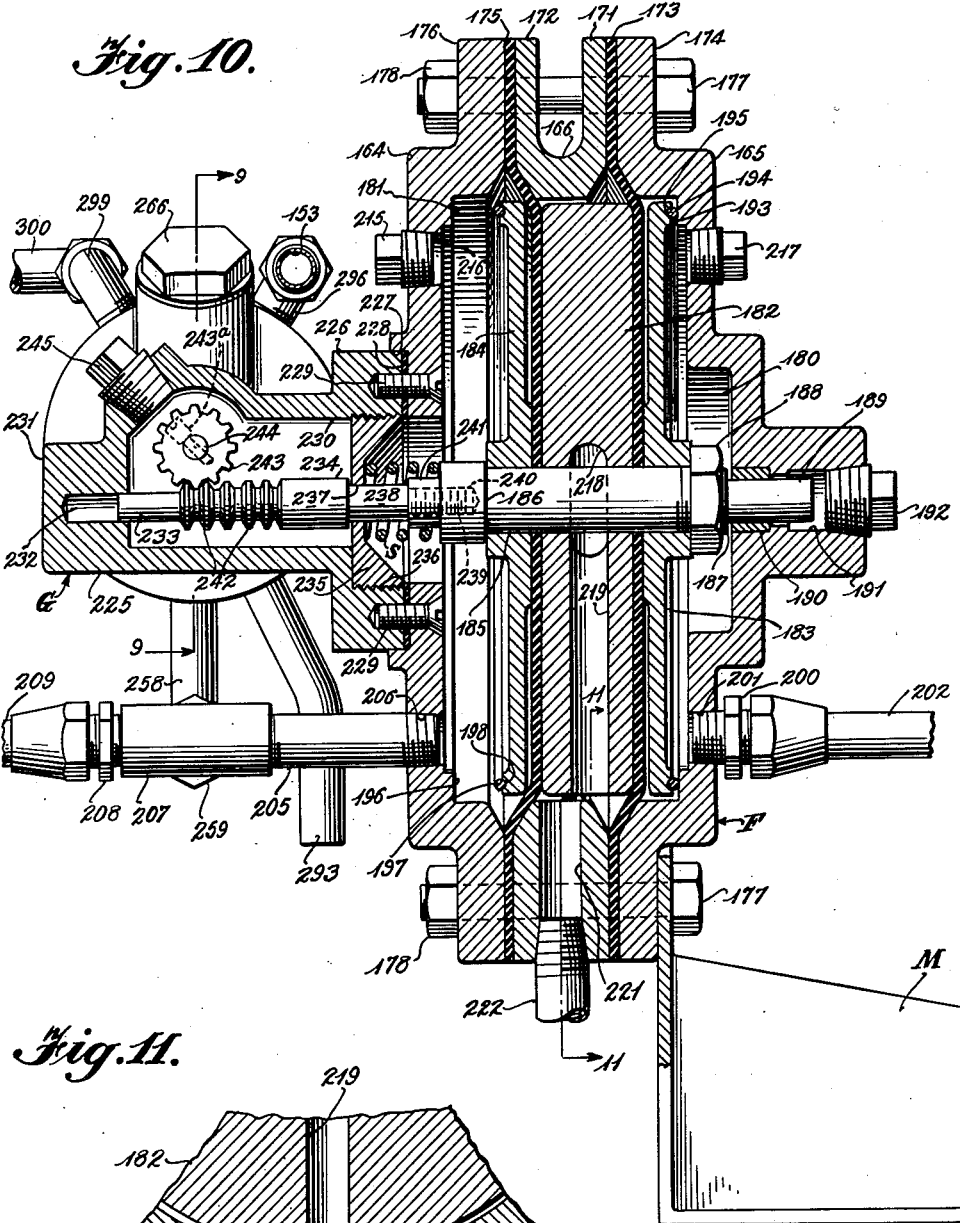

Dec. 9, 1952  D. G. GRISWOLD  2,620,816
BACKFLOW PREVENTION DEVICE
Filed May 21, 1945  15 Sheets-Sheet 8
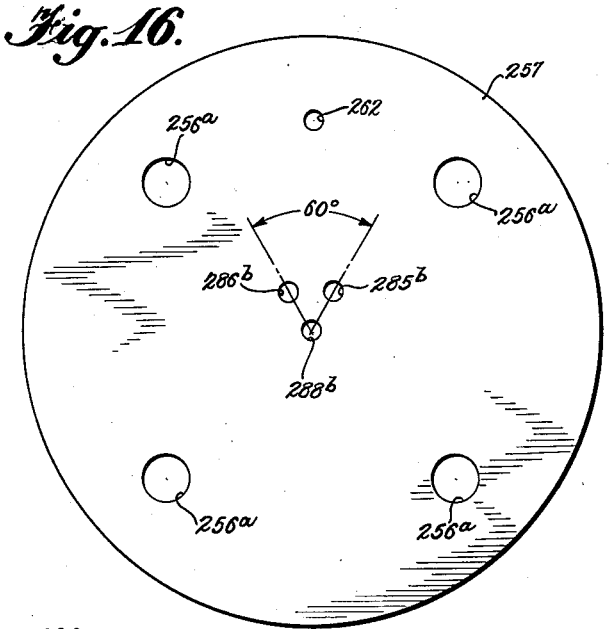
Fig. 16.
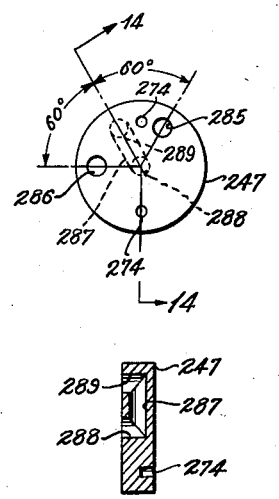
Fig. 13.
Fig. 14.
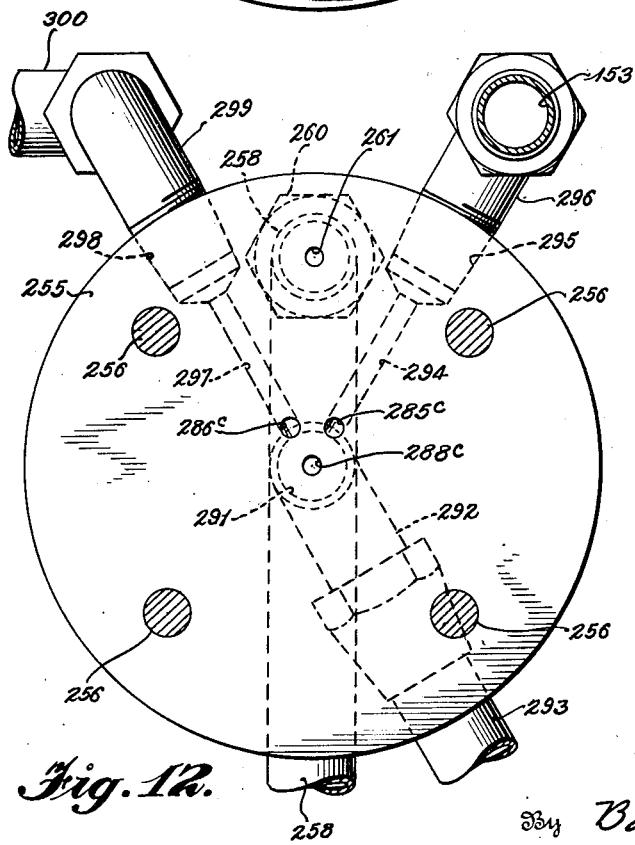
Fig. 12.
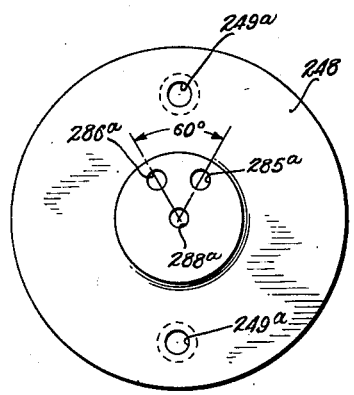
Fig. 15.
Inventor
Donald G. Griswold
By Bacon & Thomas
Attorneys

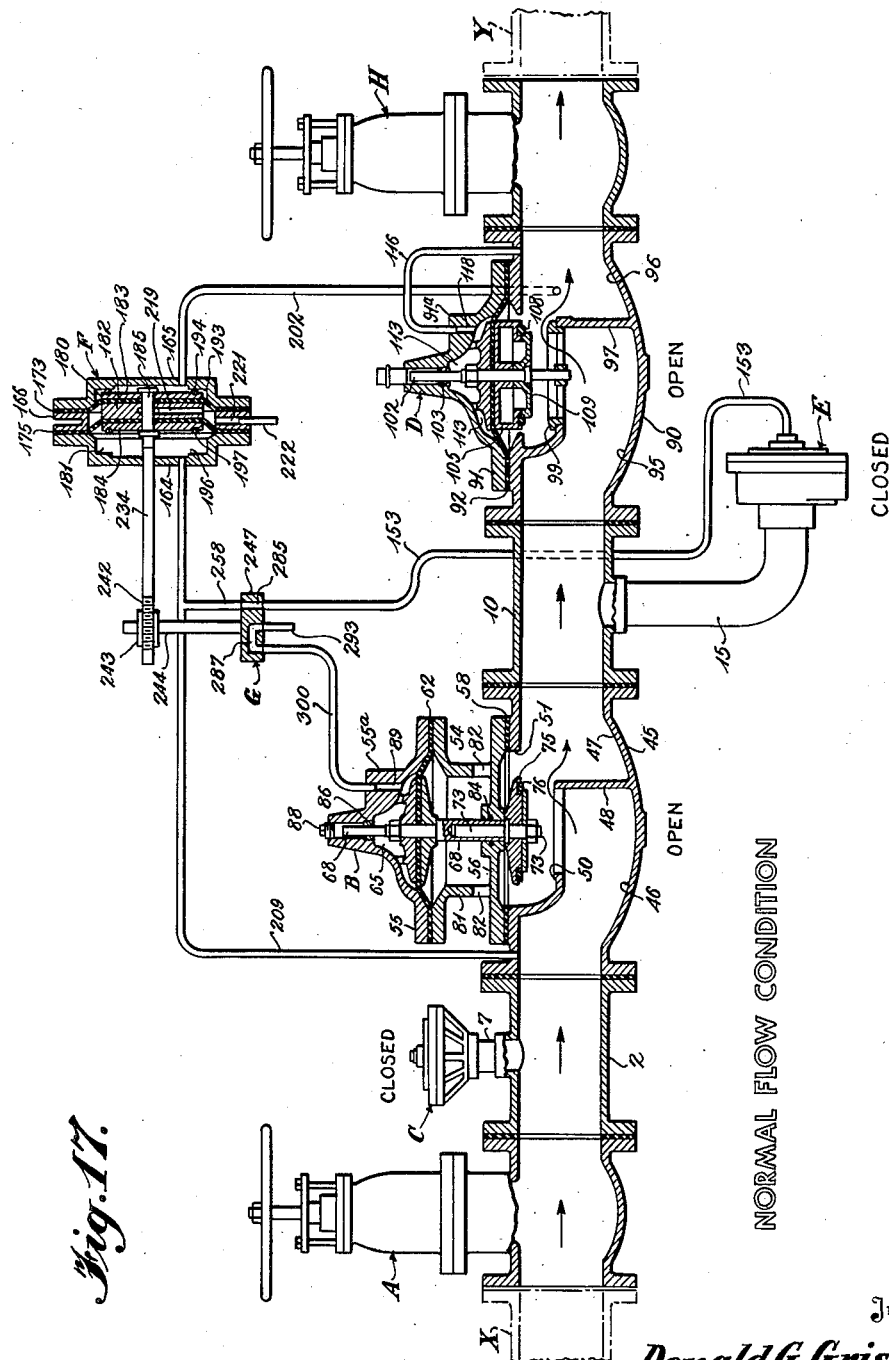

Dec. 9, 1952 D. G. GRISWOLD 2,620,816
BACKFLOW PREVENTION DEVICE
Filed May 21, 1945 15 Sheets-Sheet 10

Inventor
Donald G. Griswold
By Bacon + Thomas
Attorneys

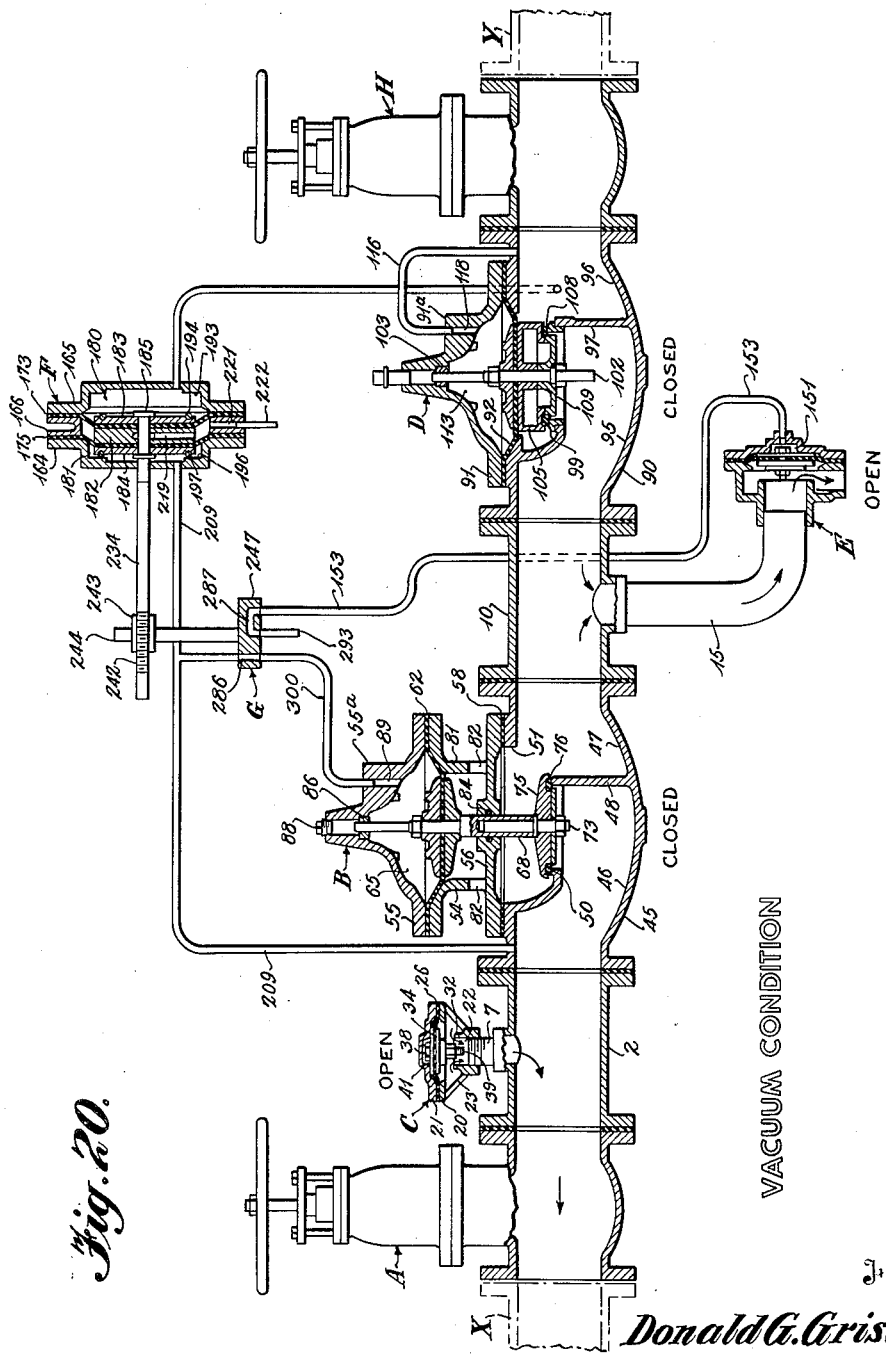

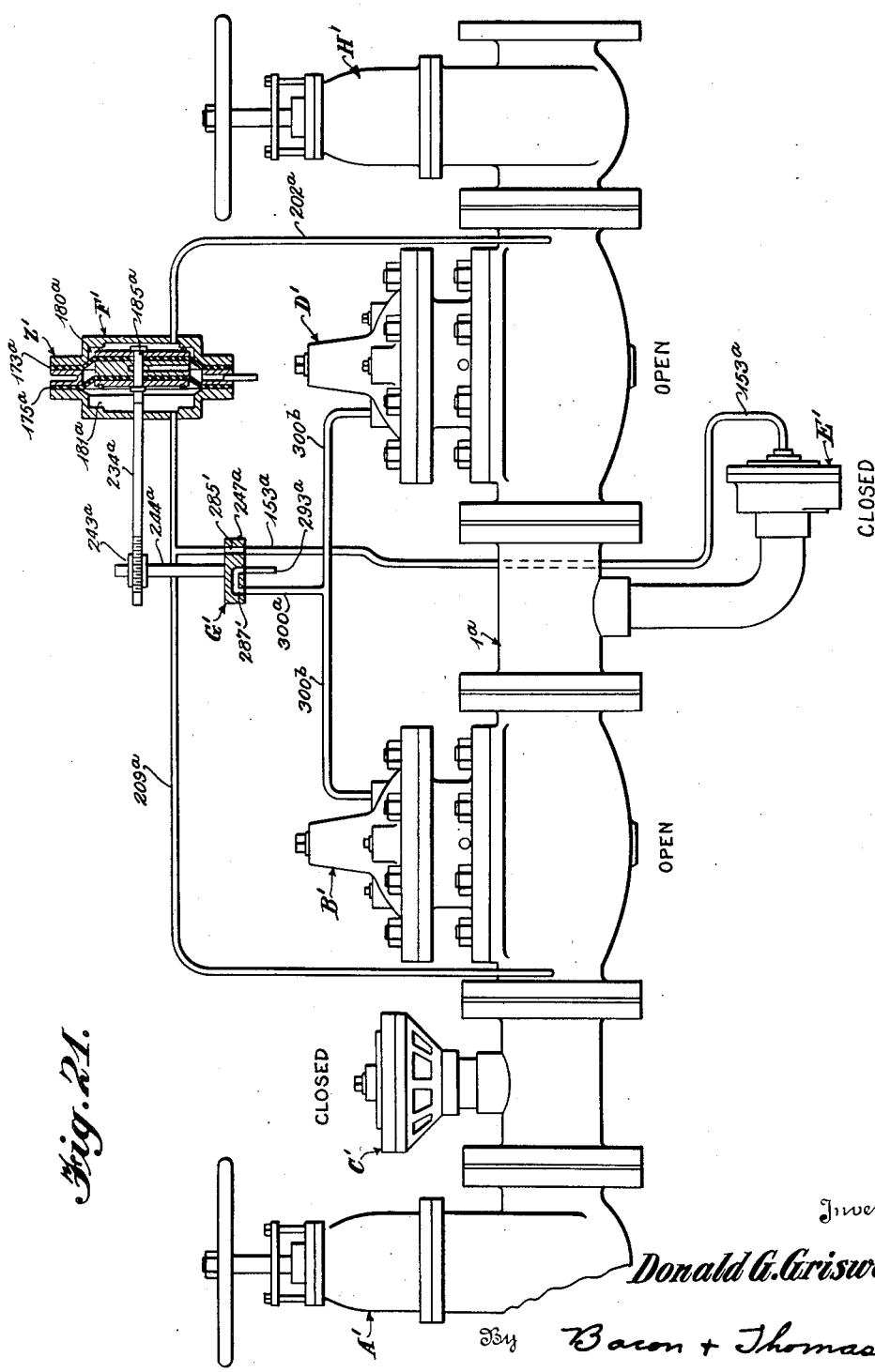

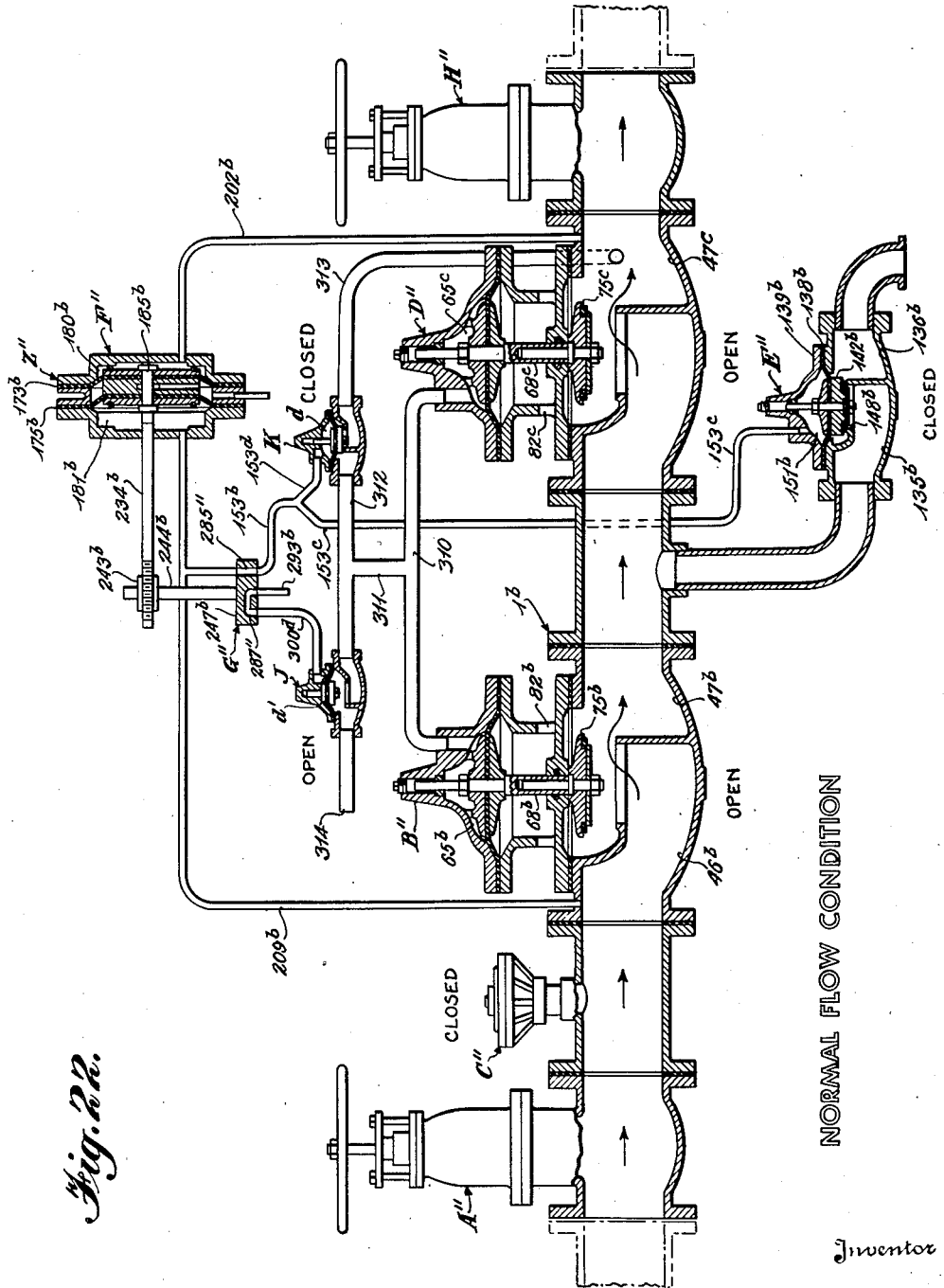

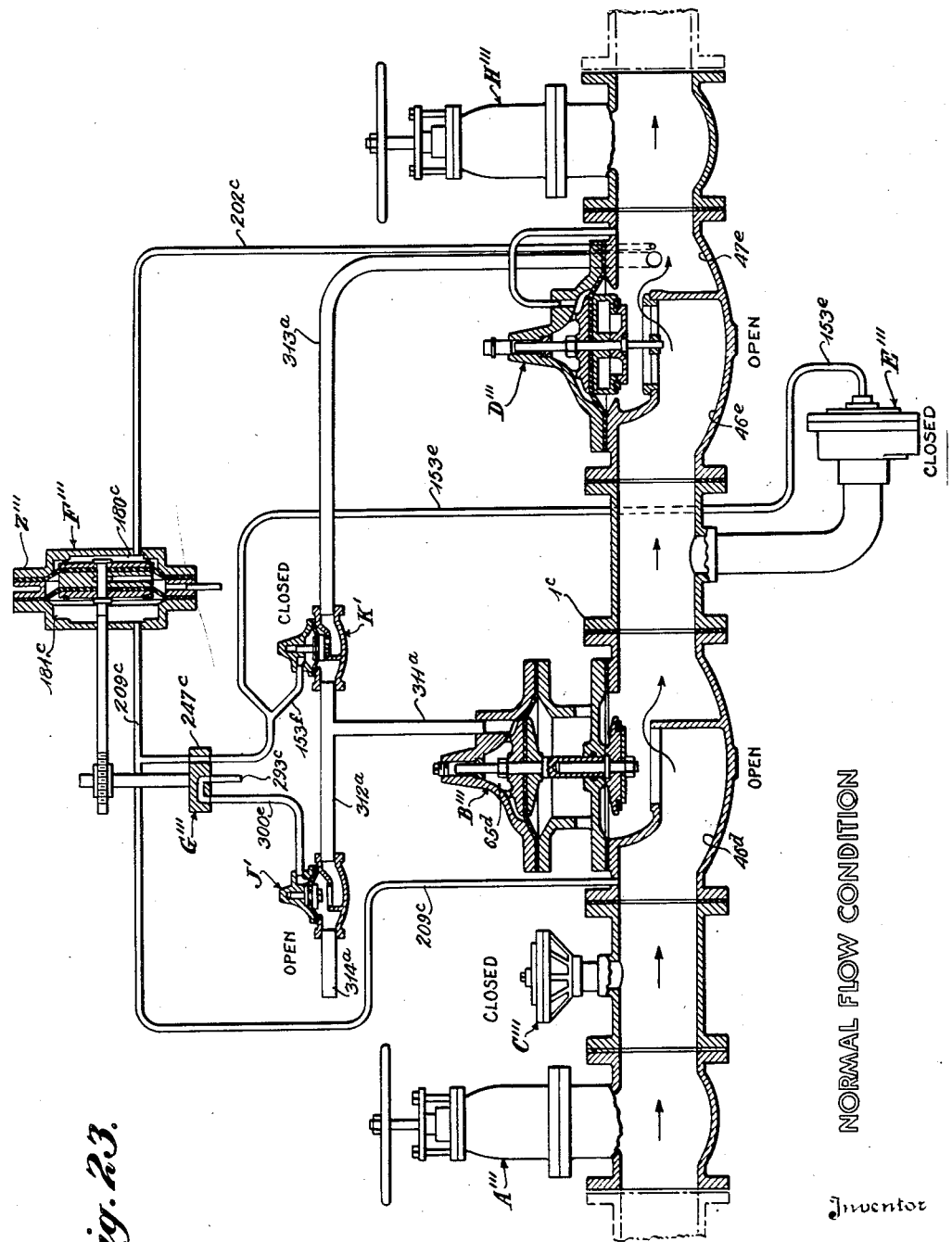

Patented Dec. 9, 1952

2,620,816

UNITED STATES PATENT OFFICE 2,620,816

BACKFLOW PREVENTION DEVICE

Donald G. Griswold, Alhambra, Calif.

Application May 21, 1945, Serial No. 595,007

30 Claims. (Cl. 137—218)

The present invention relates to backflow protection or prevention devices adapted to prevent contamination of public water distribution systems supplying drinking water to dwellings, hotels, factories, shipyards, public buildings, etc.

During recent years, sanitary engineers and health authorities have more fully recognized the importance of protecting public water supply systems against contamination resulting from cross connections and backflow or back-siphonage; that is, the pollution of the water supply by unpotable water finding its way into the city water mains from the consumer's property as the result of cross connections or backflow between contaminated water and potable water sources. Many epidemics of amoebic dysentery and other ailments have been directly traced to polluted water supply systems, thus emphasizing the great importance of providing adequate and positive safeguards.

While previous attention had been given to the problem of backflow prevention, no device representing a complete solution to the many phases of the problem was produced, and the present invention was purposely developed to meet the many objections to prior backflow prevention devices and to overcome the many known difficulties that have confronted health officers, sanitary engineers and others concerned with the problem of supplying unpolluted water to consumers.

Accordingly, the principal object of the invention is to provide backflow prevention means which meets and complies with all known sanitation requirements.

Another object of the invention is to provide dependable backflow protection means which will positively prevent all return-flow of water therethrough from the consumer's pipe system to the water supply mains.

A more specific object of the invention is to provide a backflow prevention device which will preclude back-siphoning of water from the consumer's pipe system through the backflow prevention device and into the supply main when a vacuum condition occurs in said supply main.

Another specific object of the invention is to provide a water supply protection unit which will preclude back-flow therethrough in the event that the check valve at the consumer's or service end of the unit develops a leak.

Another important object of the invention is to provide a backflow prevention unit including check valve means which will immediately close when a static condition occurs in the line and before any tendency for backflow in the line arises.

Another object of the invention is to provide a backflow prevention unit including valve means which will close by gravity when the pressure at the supply end of the unit is approximately equal to that at the service end of the unit, and which valve means is positively held closed by operating fluid under pressure in the event that the pressure at the service side of the unit becomes greater than that at the supply side of said unit.

Another object of the invention is to provide backflow protection means which is vented to the atmosphere to prevent flow therethrough in the event that the pressure on the service side of said unit exceeds the pressure on the supply side of said unit.

Another object of the invention is to provide a backflow prevention unit including "power-operated", or fluid pressure operated, valve means arranged to automatically close by gravity during a static line condition and to be positively held closed by operating fluid under pressure during a line condition tending to create a backflow.

Another object of the invention is to provide a backflow prevention unit including a plurality of check valves and means responsive to the differential pressure across said check valves for controlling the operation of at least the check valve at the supply end of said unit.

Another object of the invention is to provide a backflow prevention unit including a plurality of valves, at least one of which is operated by fluid under pressure, and a fluid pressure-responsive control device for said valve subject to the differential pressure across said valves and including means for preventing by-passing of fluid around said valves through said pressure-responsive device.

Another object of the invention is to provide a backflow prevention unit including at least one check valve provided with means for indicating malfunctioning thereof.

Another object of the invention is to provide a pressure-responsive device for use in controlling the valves of a backflow prevention unit arranged so that no leakage can occur through said pressure-responsive device around said check valves from the property or consumer's side of the line to the supply side of said line.

Another object of the invention is to provide a pressure-responsive device for controlling a backflow prevention unit including diaphragm means subject to the pressure at the opposite ends of said unit and means for indicating leakage past and/or failure of said diaphragm means.

A still further object of the invention is to provide a backflow prevention unit including a pair of check valves and a bleeder valve communicating with a space between said check valves and arranged to drain said space when the pressure upon the service or consumer's side of said unit becomes greater than that on the supply side of said unit, so that reverse flow through the unit is prevented.

Another object of the invention is to provide a backflow prevention unit including valves constructed so that they do not induce water hammer or line shock.

A still further object of the invention is to provide a backflow protection unit including fluid pressure operated valve means at the supply end of said unit at least and control means for said valve means including a ported pilot valve and means between said ported pilot valve and fluid pressure operated valve means for effecting a quicker opening and closing of said fluid pressure operated valve means than could be obtained by the use of said pilot valve alone.

Still another object of the invention is to provide novel control means for a backflow prevention unit which will effect bleeding of the unit in the event of leakage past the check valve at the service side of the unit and which will also bleed the unit in the event that a vacuum condition occurs on the supply side of the unit.

A still further object of the invention is to provide backflow prevention devices that are adapted to be completely assembled at the factory, shipped in toto, and readily installed in a water supply main as an assembled unit.

Other objects and advantages of the invention will be apparent from the following description taken in conjunction with the accompanying drawings, in which:

Fig. 1 is a front elevational view of a preferred form of backflow prevention unit embodying two gate-type shut-off valves, one at each end of the unit, a power operated pilot-controlled check valve and an automatic check valve arranged in series between said gate valves, an automatic vacuum breaker valve on the supply side of the unit between one of the gate valves and the power operated check valve, a pilot controlled bleeder valve between the two check valves, and automatic, pressure-responsive control means for actuating said pilot valve, all constructed and arranged in accordance with the principles of the present invention;

Fig. 2 is a plan view of the backflow prevention unit shown in Fig. 1;

Fig. 3 is an enlarged sectional view through the automatic vacuum breaker valve taken on the line 3—3 of Fig. 1;

Fig. 6 is an enlarged longitudinal sectional view through the automatic check valve shown in Fig. 1;

Fig. 7 is a detail sectional view taken on the line 7—7 of Fig. 6;

Fig. 10 is a sectional view through the pilot valve and the pressure-responsive device for actuating said pilot valve taken on the line 10—10 of Fig. 8;

Fig. 11 is a sectional detail view taken on the line 11—11 of Fig. 10;

Fig. 12 is a sectional view taken on the line 12—12 of Fig. 9 showing the details of the pilot base;

Fig. 13 is a view of the pilot disc;

Fig. 14 is a sectional view of the pilot disc taken on the line 14—14 of Fig. 13;

Fig. 15 is a view of the seat for the pilot disc;

Fig. 16 is a view of the pilot valve gasket;

Fig. 17 is a diagrammatic view illustrating the relative positions of the valves and control means of the backflow prevention unit illustrated in Figs. 1 and 2 during a normal flow condition in the line;

Fig. 20 is a diagrammatic view similar to Fig. 17 illustrating the parts in the positions they assume when a vacuum condition exists in the line;

Fig. 21 is a partly diagrammatic front elevational view of another form of backflow prevention unit including two power operated check valves arranged to simultaneously open and close under the control of a pressure-responsive pilot valve control device;

Figure 4:
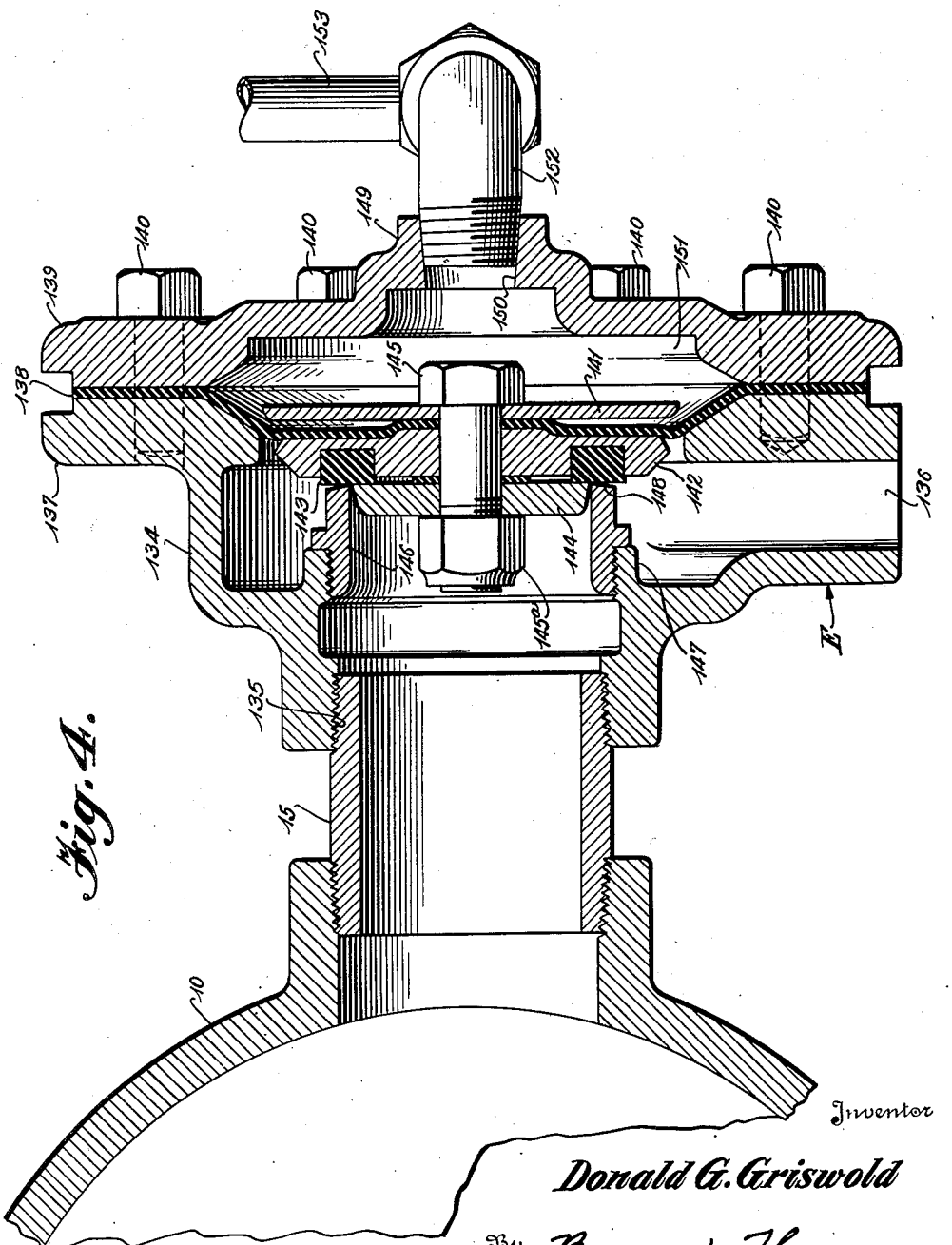
Fig. 4 is an enlarged sectional view through the bleeder valve taken on the line 4—4 of Fig. 1.

Fig. 22 is a diagrammatic view of a backflow prevention unit similar to that shown in Fig. 21 but including means between the pilot valve and power operated check valves to effect more sensitive and quick opening and closing thereof; and Fig. 23 is a diagrammatic view of a backflow prevention unit and control device similar to that shown in Fig. 1, but including means between the pilot valve and the power operated check valve to effect more sensitive and quick opening and closing thereof.

The preferred form of backflow protection unit embodying the principles of the present invention is illustrated in Figs. 1 to 20, inclusive. Referring first to Figs. 1 and 2, the backflow prevention unit is generally identified by the numeral 1 and includes a conventional, manually operated gate or shut-off valve A, the inlet side of which is connected to a supply pipe X, shown in dot-and-dash lines. The outlet side of the gate valve A is connected to one end of a pipe section 2 by a series of bolts 3, a conventional gasket 4 being interposed between the gate valve A and the pipe section 2. The opposite end of the pipe section 2 is connected with the inlet of a "power-operated" or fluid pressure operated check valve B by bolts 5, a conventional gasket 6 being interposed between the valve B and the adjacent end of the pipe section 2. One end of a pipe nipple 7 (Fig. 1) is connected with a boss on the pipe section 2 and the opposite end of said nipple is connected with an automatic vacuum breaker valve C.

A second pipe section 10 has one end thereof connected with the outlet side of the power operated check valve B by a series of bolts 11, a suitable gasket 12 being interposed between the valve B and the pipe section 10. The opposite end of the pipe section 10 is connected with the inlet of an automatic, hydraulically operated check valve D by bolts 13, a suitable gasket 14 being interposed between the pipe section 10 and said valve. One end of a pipe nipple 15 (Figs. 2 and 4) is threaded into a boss on one side of the pipe section 10 and the opposite end of said pipe nipple is connected with the inlet of a bleeder or backflow indicator valve E. The outlet 136 of the bleeder valve E preferably communicates with the atmosphere in order that the flow therefrom will provide visible evidence of a backflow condition in the line.

A control device Z consisting of a pressure-responsive device F, and a pilot valve G actuated by said pressure-responsive device, is conveniently mounted upon the check valve D in a manner which will be set forth in greater detail hereinafter. However, it may be mentioned at this point that the control device Z is arranged to automatically effect opening of the bleeder valve E and positive closing of the check valve B whenever the pressure at the inlet of the check valve B is less than that at the outlet of the check valve D.

The outlet side of the second check valve D is connected with the inlet of a conventional gate or shut-off valve H by bolts 18, a suitable gasket 19 being interposed between the valves D and H. The outlet side of the gate valve H is connected with a service pipe Y (shown in dot-and-dash lines) on the property or consumer's side of the backflow prevention unit 1.

The vacuum breaker valve C is adapted to automatically open and vent the supply pipe X to the atmosphere whenever the pressure in said pipe is less than atmospheric pressure. The opening of the valve C, of course, will prevent the creation of a vacuum condition in the pipe X, which would normally tend to siphon water through the unit 1 from the pipe Y into the pipe X.

The automatic vacuum breaker valve C is best illustrated in Fig. 3, and comprises two main housing sections 20 and 21. The housing section 20 includes a threaded inlet 22 for the reception of the upper end of the pipe nipple 7, and a series of radially outwardly and upwardly inclined arms 23 project from the outer surface of the inlet 22 to an annular flange 24. The flange 24 is provided with a surface 25 engaging one side of a flexible diaphragm 26 at the margin thereof. The housing section 21 has a similar surface 27 engaging the opposite side of the marginal portion of the diaphragm 26. The diaphragm 26 is clamped between the housing section 21 and the annular flange 24 and maintained in assembled relation therewith by a plurality of bolts 28.

The inlet 22 terminates at its upper end in an annular internally threaded portion 29 adapted to receive a threaded portion 30 of a valve seat member 31. The upper end of the valve seat member 31 is preferably inclined on an angle of about 5° to form a tapered seating surface, as indicated at 32.

A flat backing plate or disc 33 is disposed on the inner side of the diaphragm 26 and a valve disc 34 having a central, flat-topped protuberance 34a is arranged upon the outer exposed side of said diaphragm. The arrangement is very important because it permits free floating of the diaphragm 26 over about 85% of the area thereof between the discs 33 and 34 and reduces buckling tendencies and provides flexible, sensitive operation. The discs 33 and 34 are also made as large as possible consistent with the necessary flexing movement of the diaphragm 26 and the size of said diaphragm, and this is an important factor in distributing the lifting and sealing forces acting upon said diaphragm. The disc 34 is provided with an annular groove 35 in which an annular fiber or plastic sealing member 36 is disposed, said sealing member being non-adhering after long periods of contact and cooperable with the surface 32 of the seat member 31 to control the venting of the pipe X to the atmosphere through said seat member. A clamping washer 37 engages the inner portion of the lower side of the sealing member 36, and a bolt 38 has its shank 39 extending through the plate 33, diaphragm 26, disc 34, and washer 37, and a nut 40 on said shank secures the parts in assembled relation. Spacer means 39a in the form of one or more fiber washers is disposed between the disc 34 and washer 37 to permit the necessary clamping pressure to be applied to the central portion of the diaphragm 26 without causing such distortion of the sealing member 36 as would result in faulty seating.

The housing section 21 is recessed to provide a chamber 41 for operating fluid effective to flex the diaphragm 26 downwardly and thus urge the sealing member 36 into engagement with the seat 32, and a longitudinal passage 42 in the bolt shank 38 establishes communication between the inlet 22 and the chamber 41. The housing section 21 is also provided with a threaded opening 43 which is closed by a plug 44 when said housing section is used on a vacuum breaker valve instead of on a pressure fluid operated valve such as the valve E, described later, in which case a conduit may be connected with said opening. Obviously, the opening 43 and plug 44 may be omitted when the housing section 21 is used on a vacuum breaker valve.

It will be apparent that the pressure in the pipe line X will be communicated to the diaphragm chamber 41 through the pipe nipple 7 and passage 42 in the bolt shank 39. So long as this pressure is above atmospheric, water will be introduced into the diaphragm chamber 41 and will urge the sealing member 36 against its seat 32 to automatically close the vacuum breaker valve C and prevent the flow of water to the atmosphere. However, should the pressure in the pipe X drop below atmospheric pressure for any reason, then air at atmospheric pressure immediately becomes effective upon the lower side of the diaphragm 26 to expel the fluid from chamber 41 via passage 42 and lift the sealing member 36 from its seat 32 and thus automatically vent the pipe X to the atmosphere to prevent the creation of a vacuum condition in said pipe. The opening of the valve C is greatly facilitated by the fact that the lower end of the bolt shank 39 extends a substantial distance below the seat 32, thereby enabling the air rushing into the valve to rapidly siphon the fluid from the chamber 41 and effect very quick opening of the valve. Such opening of the valve C will positively preclude siphoning of water through the unit 1 from the consumer's side to the supply side of said unit. The automatic opening of the vacuum breaker valve C is accompanied by closing of the check valves B and D and simultaneous opening of the bleeder valve E, as will be explained more fully hereinafter.

Figure 5:
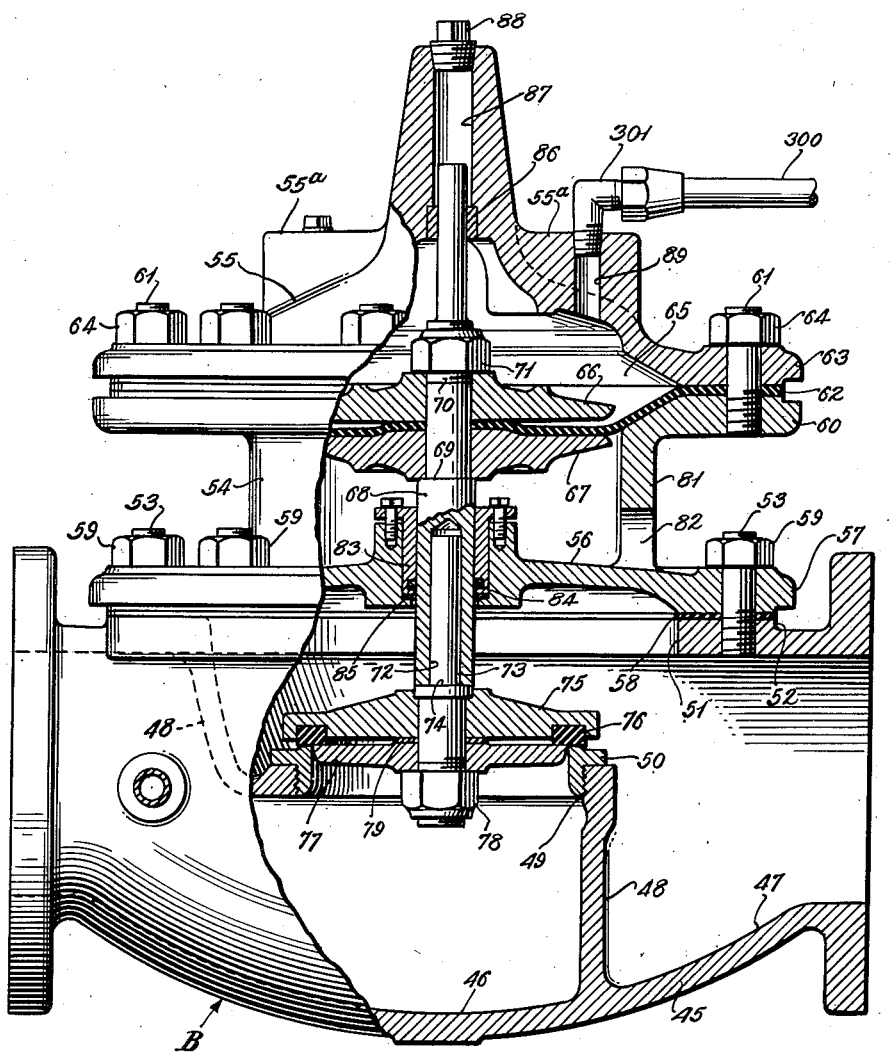
Fig. 5 is an enlarged longitudinal sectional view through the power operated check valve shown in Fig. 1.

The "power-operated" check valve B is best illustrated in Fig. 5. The valve B comprises a body 45 having an inlet opening 46 and an outlet opening 47 separated by a partition 48. The partition 48 is provided with a threaded opening 49 for the reception of a seat 50. The body 45 is further provided with a central opening 51 at its upper end surrounded by a annular boss 52. A series of studs 53 is mounted in the boss 52.

The valve B further includes an intermediate section 54 and a cover 55. The intermediate section 54 has a lower wall portion 56 which overlies the opening 51 in the body 45 and has a lower radial flange 57 in alignment with the boss 52. A gasket 58 is disposed between the flange 57 and the boss 52 and a series of nuts 59 on the studs 53 secures the intermediate section 54 to the body 45.

The intermediate section 54 is provided at its upper end with a radially extending flange 60 which carries a series of studs 61. These studs extend through a diaphragm 62 and a flange 63 formed on the cover 55. A nut 64 threaded on each of the studs 61 clamps the marginal portion of the diaphragm 62 between the flanges 60 and 63 to thus secure the cover 55 to the intermediate section 54.

The cover 55 is recessed to provide a diaphragm chamber 65 at the upper side of the diaphragm 62 adapted to receive operating fluid under pressure to effect closing of the valve B. The central portion of the diaphragm 62 is clamped between plates 66 and 67, a valve stem section 68 extending through said plates and diaphragm and having a shoulder 69 engaging the plate 67 and a threaded portion 70 adapted to receive a self-locking nut 71 engageable with the plate 66, whereby to maintain said valve stem section, plates and diaphragm in assembled relation. The valve stem section 68 is provided with an axial passage 72 which slidably receives the upper end of an auxiliary valve stem section 73. The auxiliary valve stem section 73 is shouldered as indicated at 74 and projects through a valve disc 75. The valve disc 75 carries an annular sealing member 76 which is cooperable with the seat 50 to cut off flow between the inlet chamber 46 and the outlet chamber 47 of the valve B. A washer 77 engages the inner portion of the lower side of the sealing member 76 to retain the same in place. The auxiliary valve stem section 73 extends through the washer 77 and a self-locking nut 78 secures said valve disc and washer to said auxiliary valve stem section. A suitable fiber washer 79 permits the necessary clamping pressure to be applied to the disc 75 and washer 77 without undue distortion of the sealing member 76. The lower end of the valve stem section 68 is adapted to engage the shoulder 74 of the valve stem section 73 to cause the member 76 to engage the seat 50 when operating fluid under pressure flexes the diaphragm 62 downdownwardly.

The intermediate valve section 54 includes a cylindrical wall portion 81 which lies between the flanges 57 and 60. The wall 81 is provided with one or more vent openings 82 which lie immediately above the wall 56 and establish communication between the interior of the intermediate valve section 54 and the atmosphere. The wall 56 carries a gland 83 serving as a guide for the lower end of the valve stem section 68, said gland carrying suitable packing 84 for preventing leakage along the outside of said valve stem section. Additional packing 85, engaged by the lower end of the gland 83, serves to prevent leakage between the gland 83 and the adjacent surface of the wall 56. However, it will be apparent that if any liquid should leak along the valve stem section 68 from the outlet chamber 47 of the valve body B, or if any leakage should occur along said valve stem from the diaphragm chamber 65, the same will flow out of the intermediate valve section 54 through the vent openings 82. It will also be apparent that, if the diaphragm 62 becomes ruptured, operating fluid will discharge through the openings 82. Thus, the openings 82 serve to indicate and reveal malfunctioning of the check valve B.

While the gland 83 serves as a guide for the lower end of the upper valve stem section 68, the upper end thereof is guided in a bushing 86 at the lower end of a passage 87 in the cover 55, the passage 87 being closed at its upper end by a plug 88. The lower valve stem section 73 is guided in its movements by the walls of the passage 72 formed in the upper valve stem section 68. Operating fluid is admitted and exhausted from the diaphragm chamber 65 through a passage 89 formed in any one of a plurality of bosses 55ᵃ on the cover 55.

It will be apparent that, with the foregoing valve arrangement, it is impossible for any interchange of fluid to occur between the outlet chamber 47 of the valve B and the diaphragm 65 of said valve. Instead, leakage from either of the chambers 47 and 65 is exhausted to the atmosphere through the vent openings 82, so that the arrangement serves as a means to positively prevent pollution of the water in the pipe X.

The automatic pressure-responsive check valve D is best illustrated in Figs. 6 and 7. The check valve D comprises a body 90, a cover 91, and a diaphragm 92 arranged between said body and cover. A series of studs 93 is mounted in the body 90 and each extends through the diaphragm 92 and cover 91 and receives a nut 94 for securing said body, diaphragm and cover in assembled relation. The body 90 includes an inlet opening or chamber 95 and an outlet opening or chamber 96 separated by partition means 97 provided with an opening 98 establishing communication between said inlet and said outlet chambers. A removable seat 99 is threadedly mounted in the opening 98 and is provided with a plurality of radial arms 100 which merge centrally and provide a guide 101 for the lower end of a valve stem 102. The upper end of the valve stem 102 is guided in a bushing 103 (Fig. 7) mounted in the cover 91. The valve stem 102 extends through a central opening in the diaphragm 92 and carries a disc-like diaphragm supporting plate 104 which engages a portion of the upper surface of the diaphragm 92 and also carries a lower diaphragm supporting member 105 which engages a portion of the lower side of said diaphragm. The member 105 has an inwardly projecting flange 106 at its lower side provided with an annular recess 107 in which an annular sealing ring 108 is adapted to rest and to engage the upper surface of the seat 99 when the valve D is closed to prevent all flow between the inlet chamber 95 and the outlet chamber 96. The valve stem 102 further carries a retainer plate 109 for maintaining the sealing ring 108 in the recess 107. The retainer plate 109 is engaged by an enlargement 110 on the valve stem 102 and is clampingly secured against the sealing ring 108 and is maintained in assembled relation with the diaphragm supporting member 105 and the plate 104 by a self-locking nut 111 which is mounted upon a threaded portion 112 of the valve stem 102.

The cover 91 is recessed to provide a chamber 113 above the diaphragm 92 adapted to receive fluid under pressure for effecting downward flexing of the diaphragm 92 to cause the sealing ring 108 to engage with the seat 99 and thus close the valve D.

The valve B is adapted to be controlled by the pilot valve G, as will be explained more fully hereinafter, but the valve D is constructed so that closing thereof is automatically effected when the pressure in the outlet opening 96 thereof is greater than that in the inlet opening 95. In order to accomplish such automatic operation, fluid for effecting closing of the valve D is conveniently taken from the outlet chamber 96. Thus, the valve D has a conventional elbow 114 (Fig. 2) threaded into a tapped opening 115 in the side wall thereof in the zone of the outlet chamber 96 and one end of a conduit 116 is connected with said elbow, the opposite end of said conduit being connected by a conventional fitting 117 with a boss 91ª formed on the cover 91. The fitting 117 communicates with a passageway 118 (Fig. 7) leading to the diaphragm chamber 113. One conduit 116 may be sufficient for certain installations, but in order to speed up the operation of the valve D an additional conduit 119 is employed. One end of the conduit 119 is connected by a conventional fitting 120 with a second boss 91ᵇ on the cover 91 and a passageway 122 establishes communication between the fitting 120 and the diaphragm chamber 113. The opposite end of the conduit 119 is connected by a conventional fitting 123 with a lateral opening 124 (Figs. 1 and 6) of a conventional four-way fitting 125. One end of the fitting 125 is connected by a pipe nipple 126 (Fig. 2) with a tapped opening 127 communicating with the outlet chamber 96 of the valve D. A test cock 128 is connected by a pipe nipple 129 with the other end of the fitting 125. A second test cock 130 is connected to a nipple 131 communicating with the inlet chamber 95 of the check valve D. The test cock 128 is adapted to be connected by a conduit (not shown) with a source of pressure such as the test cock 213 communicating with the inlet of the gate valve A (at a time when the gate valves A and H are closed) to check the operation of the pilot valve G and to determine whether the check valve D is leaking. Interconnection of the test cocks 130 and 213 will check the operation of the bleeder valve E and also leakage through the check valve B. However, it will be understood that, alternatively, pressure gauges (not shown) may be connected with the outlet of the test cocks 128 and 130 to obtain an indication of the pressure existing in the outlet and inlet openings 96 and 95, respectively, of the valve D, if desired.

It will be apparent from the foregoing, that whenever the pressure in the outlet chamber 96 of the valve D exceeds that in the inlet chamber 95, the outlet pressure will be communicated through the conduits 116 and 119 to the diaphragm pressure chamber 113 to effect downward flexing of the diaphragm 92 with consequent downward movement of the valve stem 102 to move the sealing ring 108 into engagement with the seat 99 to cut off all flow through the valve. The design and construction of the automatic check valve D is such that the differential pressure in the inlet and outlet openings 95 and 96, respectively, required to open or close said valve does not exceed 1 lb. per square inch so that very sensitive valve operation is assured. Even under static flow conditions, that is, when the pressure in the inlet chamber 95 substantially equals the pressure in the outlet chamber 96, the valve B will close because of the weight of the stem 102, member 105, etc., and the then greater effective area of the diaphragm 92 exposed to the pressure of the fluid in the diaphragm chamber 113.

The check valve D always closes against the direction of normal flow, gradually, thereby eliminating all operating noise, hammering and line shock. The closing rate of the valve D can be determined by the number of conduits 116 and 119 employed and also by the internal diameter of such conduits in order to admit operating fluid into the diaphragm chamber 113 at a predetermined desired rate. On the other hand, when the pressure in the inlet 95 exceeds that in the outlet 96 (which is the normal condition), the valve D will open gradually, and remain fully open so long as the inlet pressure is the greater.

The bleeder valve E is best illustrated in Fig. 4, and, as shown, includes a housing section 134 provided with a threaded inlet opening 135 for mounting the same upon one end of the pipe nipple 15 and an outlet opening 136, which preferably communicates with the atmosphere. The housing section 134 also includes a radially extending flange 137 which engages the marginal portion of one side of a flexible diaphragm 138. A second housing section 139 engages the marginal portion of the opposite side of the diaphragm 138; the housing section 134, diaphragm 138 and housing section 139 being secured together in assembled relation by a plurality of bolts 140. A backing plate 141 engages one side of the diaphragm 138 and a valve disc 142 engages the opposite side of said diaphragm. The valve disc 142 carries a sealing ring 143 which is retained in place by a clamping washer 144. A bolt 145 extends through the plate 141, diaphragm 138, the disc 142 and washer 144, and a nut 145ª is threaded on the bolt 145 to retain the parts in assembled relation.

A seat member 146 is threaded into a neck 147 formed in the housing section 134 inwardly of the inlet 135 and provides a beveled, annular seating surface 148 adapted to be engaged by the sealing ring 143 of the valve disc 142 to prevent flow through the valve E during normal operation of the unit 1.

The housing section 139 has a central boss 149 provided with a passage 150 communicating at its inner end with a chamber 151 disposed at one side of the diaphragm 138 and adapted to receive operating fluid under pressure to normally maintain the valve E closed. The passage 150 has a conventional elbow fitting 152 mounted therein which is connected to one end of a conduit 153. The opposite end of the conduit 153 is connected with the pilot valve G (Fig. 1) as will be set forth hereinafter.

The operation of the bleeder or backflow indicating valve E is not directly responsive to the pressure in either its inlet 135 or its outlet 136 but on the other hand, its opening and closing is controlled by the pilot valve G whose operation in turn is determined by the pressure-responsive control device F, which is actuated in accordance with the pressure differential across the check valves B and D, as will be explained hereinafter.

Referring now to Fig. 10, the pressure-responsive device F comprises end housing sections 164 and 165 and an intermediate housing section 166. The intermediate housing section 166 is annular and substantially U-shaped in cross-section, thus providing spaced flanges 171 and 172. A flexible diaphragm 173 is clamped at its outer margin between a flange 174 of the housing section 165 and the flange 171. A second flexible diaphragm 175 is clamped at its outer marginal portion between a flange 176 of the housing section 164 and the flange 172. A plurality of bolts 177 extend through the flange 174, diaphragm 173, flanges 171 and 172, diaphragm 175 and flange 176, and nuts 178 threaded onto said bolts maintain the housing sections and diaphragms in assembled relation. A bracket M may be connected to the pressure-responsive device F by two or more of the bolts 177 and serves as a means for mounting the same upon the check valve D in the manner indicated in Fig. 1.

It will be noted that the diaphragm 173 cooperates with the housing section 165 to provide a pressure chamber 180 and that the diaphragm 175 cooperates with the housing section 164 to provide a pressure chamber 181. It will be further noted that the space between the diaphragms 173 and 175 within the intermediate housing section 166 is substantially filled by an annular spacer 182. A backing plate 183 is disposed in the chamber 180 at the adjacent side of the diaphragm 173 and a similar backing plate 184 is disposed in the chamber 181 at the adjacent side of the diaphragm 175. A stem or rod 185 extends through the backing plate 184, the diaphragm 175, the spacer 182, the diaphragm 173 and the backing plate 183 and has an enlargement 186 providing a shoulder engaging the outer surface of the backing plate 184. The stem 185 has an intermediate threaded portion 187 and a nut 188 threaded on said portion clampingly maintains the backing plates, diaphragms and spacer in assembled relation. The stem 185 has a reduced end 189 which is slidably received in a bushing 190 mounted in the inner end of a passage 191 in the housing section 165. The outer end of the passage 191 is closed by a plug 192.

The inner side wall surface of the housing section 165 is provided with an annular seat 193 adapted to be engaged by an annular packing ring 194, which is preferably circular in transverse cross-section and received in a groove 195 formed in the outer confronting face of the backing plate 183. The housing section 164 may also be provided with a similar annular seat 196 and the backing plate 184 may also be provided with a similar packing ring 197 received in a groove 198, although the packing ring 194 is not absolutely necessary. The importance and purpose of the packing rings, and particularly the packing ring 197, will be set forth more fully hereinafter.

A conventional fitting 200 is threaded into a passageway 201 in the housing section 165 and communicates with the chamber 180 at the lower portion thereof at a point inwardly of the seat 193. One end of a conduit 202 is connected with the fitting 200 and the opposite end of said conduit is connected by a conventional fitting 203 (Figs. 1 and 6) with a lateral opening 204 of the four-way fitting 125 communicating with the outlet chamber 96 of the automatic check valve D. Thus, the chamber 180 of the pressure-responsive device F always communicates with and is subject to variations in pressure corresponding to those which occur in the outlet chamber 96 of the check valve D.

A conventional pipe nipple 205 (Fig. 10) has one end thereof threaded into an opening 206 in the housing section 164 and communicates with the chamber 181 at the lower portion thereof at a point inwardly of the seat 196. One end of a pipe-T 207 is connected with the opposite end of the pipe nipple 205 and the opposite end of said pipe-T has a conventional fitting 208 mounted therein. The fitting 208 is connected with one end of a conduit 209. A pipe-T 210 (Fig. 2) is mounted on the valve B so as to be in communication with the inlet side thereof and a test cock 211 is connected with the outer end of said pipe-T for determining the presence of fluid on the inlet side of the valve B. A conventional fitting 212 mounted in the stem of the pipe-T 210 is connected with the opposite end of the conduit 209 so that the pressure in the chamber 181 will vary in accordance with the pressure in the inlet of the check valve B.

The test cock 213, previously referred to, is connected with the inlet side of the gate valve A by a pipe nipple 214, thus providing a source of water under pressure connectable with test cocks 128 and 130 for checking the operation of the various elements of the backflow unit, as previously described.

The housing section 164 has a vent plug 215 (Fig. 10) mounted in a threaded opening 216 communicating with the upper portion of the chamber 181 at a point inwardly of the seat 196. The plug 215 may be removed to permit the escape of air from the chamber 181 when the pressure-responsive device F is first set up for operation. The housing section 165 has a similar plug 217 located inwardly of the seat 193 for venting the chamber 180. The annular spacer 182 disposed between the diaphragm 173 and 175 is provided with a groove 218 surrounding the stem or rod 185 and a radial passageway 219 extending downwardly from the groove 218 and establishing communication between said groove and the narrow chamber between the outer periphery of said spacer and the inner periphery of the intermediate housing section 166. The housing section 166 has a bridge 220 at its lower portion between the flanges 171 and 172, as best shown in Fig. 11, and said bridge is provided with a drain passage 221 having one end of a drain tube 222 threadedly mounted therein. The object of the groove 218, radial passageway 219, drain passage 221, and drain tube 222 is to prevent intercommunication between the chambers 180 and 181 of the pressure-responsive device in the event that leakage should occur along the rod 185. Thus, any leakage which occurs along the rod 185 from either chamber 180 or 181 will find its way into the groove 218 and eventually drain out of the pressure-responsive device F through the drain tube 222 instead of finding its way into the other chamber. This is important because it would be highly undesirable to have any fluid from the service pipe Y by-pass the check valves B and D through the pressure-responsive device F. Also, in the event that the diaphragm 173 should break, the fluid in the chamber 180 would drain to the atmosphere through the tube 222. Similarly, any failure of the diaphragm 175 would result in the fluid from the chamber 181 flowing out through the tube 222. In any event, the presence of water dripping or flowing out of the tube 222 will serve to indicate malfunctioning of the pressure-responsive device F and thus provide a valuable safety feature.

The construction of the intermediate housing section 166 of U-shaped cross-section provides a further safety feature in that any leakage that might occur along the bolts 177 from either of the chambers 180 and 181 will drain to the atmosphere at a point between the legs or flanges 171 and 172, instead of finding its way into the other chamber.

The pressure-responsive device F provides a still further and important safety feature by virtue of the seal that will be provided between the chambers 180 and 181 by the packing ring 194 or 197 in the event of failure of both of the diaphragms 173 and 175. The packing 197 is, of course, the most important of the two because it will engage the annular surface 196 and form a seal to prevent the flow of water from the consumer's side of the unit toward the supply side of the unit and thus avoid possible pollution of the water supply. Thus, in the event of failure of the diaphragms 173 and 175, the backing plate 184, the spacer 182 and the backing plate 183 will function similar to a piston and will be shifted bodily toward the left or right, depending upon which backing plate is subjected to the higher pressure. Hence, if we assume that a backflow condition exists in the pipe line X—Y, that is to say, that the pressure communicated to the chamber 180 through the conduit 202 connected with the check valve D exceeds that communicated to the pressure chamber 181 through the conduit 209 connected with the check valve B, the greater pressure in the chamber 180 will cause the packing ring 197 carried by the backing plate 184 to engage the surface 196 and form a tight seal, thereby preventing water from by-passing the check valves B and D through the pressure-responsive device F and avoiding possible pollution of the water in the supply pipe X.

The packing ring 194 is of less importance than the packing ring 197 and may be dispensed with entirely, if desired, inasmuch as no particular hazard or dangerous condition would be created by passage of the fluid from the chamber 181 to the chamber 180 because the flow from the pipe X through the pressure-responsive device F to the consumer's side of the unit would not result in polluting the supply of water to the consumer (see Fig. 17). The principal danger lies in the reverse flow through the pressure-responsive device F which, under back flow conditions, would be precluded by the packing ring 197 (see Fig. 19). However, the provision of a packing ring for each of the backing plates 183 and 184 affords two-way protection and provides a foolproof construction.

It will be understood that, in any event, the failure of either of the diaphragms 173 and 175, should such occur, will be indicated by the discharge of a stream of water from the drain tube 222, thus providing visible evidence of a condition requiring immediate attention.

The importance of preventing all intercommunication between the chambers 180 and 181 will be apparent when the fact is considered that the chamber 181 is connected by the conduit 209 with the supply or unpolluted side of the backflow prevention unit and the chamber 180 is connected by the conduit 202 with the outlet side of the unit, or the consumer's side which may communicate with a possible source of pollution. Hence, in the absence of means in the pressure-responsive device F positively safeguarding the unit against all intercommunication between the inlet and outlet sides of the unit through the conduits 202 and 209, it might otherwise be possible (unless undesirably frequent inspections are made) for polluted water under backflow conditions to by-pass the check valves B and D and enter the supply line X.

It will be apparent from the foregoing, that the pressure-responsive device F is preferably connected across the two check valves B and D and will be actuated in accordance with the pressure differential existing between the pressure in the inlet chamber 46 of the power operated check valve B and that in the outlet chamber 96 of the automatic check valve D. Accordingly, the diaphragms 173 and 175 will be flexed either toward the left or toward the right as viewed in Fig. 10, depending upon whether the chamber 96 or 46, respectively, contains the higher pressure. The diaphragms 173 and 175 are shown flexed toward the right in Fig. 10 which is the normal position of the diaphragms corresponding to the existence of a higher pressure at the inlet side of the unit 1 than exists at the outlet side of said unit.

It is to be understood that the pressure-responsive device F may obviously be connected across the check valves B and D without necessarily connecting the conduits 202 and 209 to these particular valves, although the present arrangement has the advantage that it effects the maximum of economy in the amount of tubing required per unit.

The pilot valve mechanism G (Figs. 8, 9 and 10) includes a housing 225 having a flange 226 at one side thereof for conveniently mounting said mechanism upon the housing section 164. To this end, the housing section 164 is suitably counterbored as indicated at 227, and a gasket 228 is interposed between the base of the counterbore and the adjacent face of the flange 226 forming a leakproof seal. A plurality of countersunk screws 229 extend through the side wall of the housing section 164 into the flange 226 and rigidly secure the pilot valve housing 225 to the housing section 164.

The pilot valve housing 225 contains a chamber 230, closed at one end by a wall portion 231 provided with a bore 232 serving as a guide for one end 233 of a rod 234. The chamber 230 is closed at its opposite end by a disc 235 mounted in a threaded recess 236 formed in the flange 226. The disc 235 has a central opening 237 which serves as a guide for the opposite end portion 238 of the rod 234. The rod portion 238 carries a reduced threaded extension 239 which is received in a threaded opening 240 formed in the enlargement 186 of the rod 185. A spacer 241 is interposed between the rod portion 238 and the enlargement 186. The rod 185 and the rod 234 are thus interconnected by the threaded portion 239 for simultaneous reciprocating movement. The spacer 241 is arranged to permit sufficient travel of the rods 234 and 185 toward the left, as viewed in Fig. 10, to enable the ring 197 to sealingly engage the seat 196. Correspondingly, the shoulder provided by the reduced rod portion 238 is arranged to permit sufficient movement of the rods 185 and 234 toward the right, as viewed in Fig. 10, to enable the ring 194 to sealingly engage the seat 193.

The rod 234 is provided with a series of spaced ridges 242 that mesh with the teeth of a pinion 243 disposed in the chamber 230 and mounted upon one end of a pilot drive shaft 244. A removable plug 245 provides access to the chamber 230 for assembly of a set screw 243ᵃ to secure the pinion 243 to the shaft 244.

Figures 8, 9:
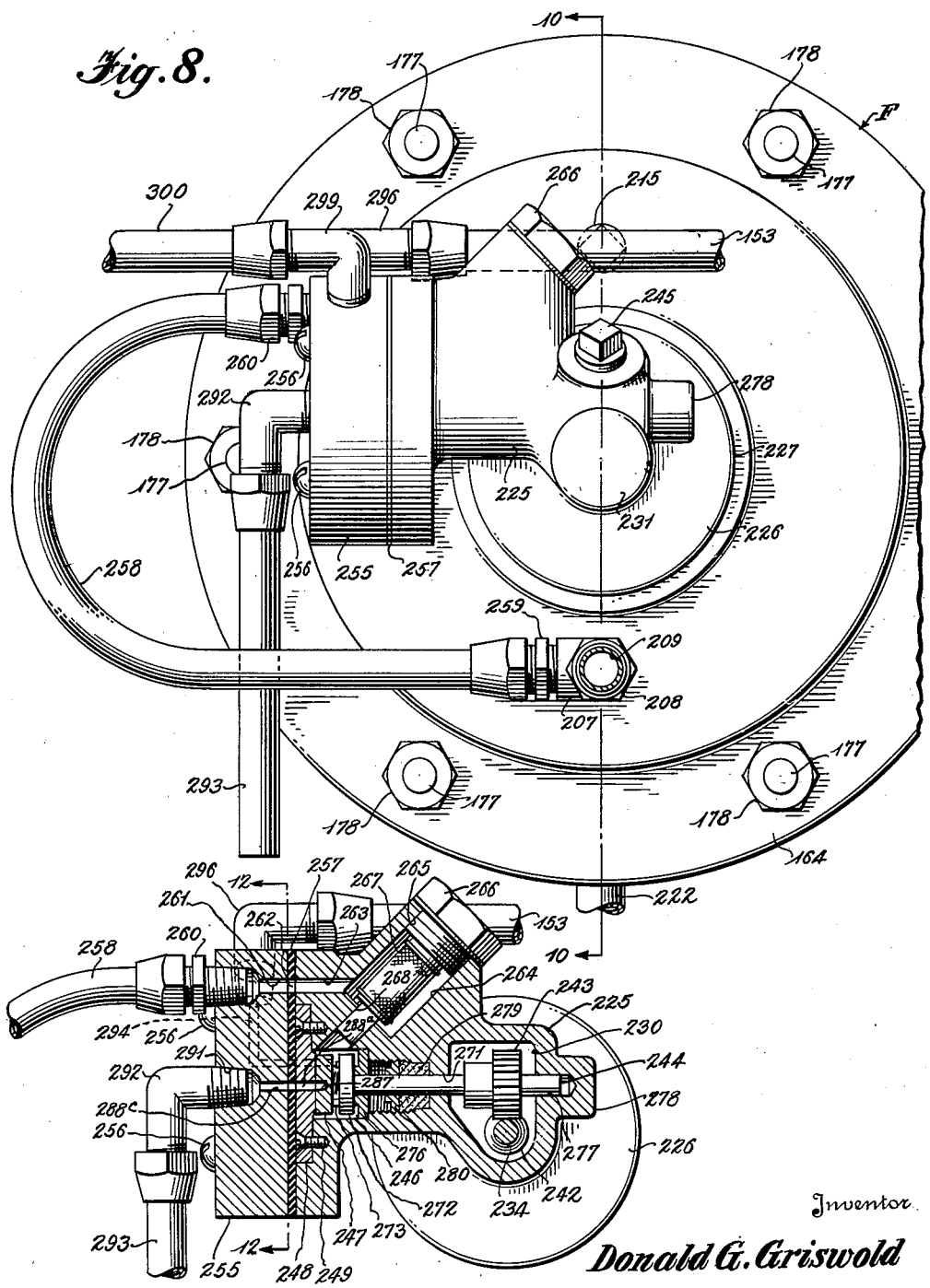
Fig. 8 is an enlarged left side elevational view of the automatic control means shown in Fig. 1.
Fig. 9 is a sectional view through the pilot valve taken on the line 9—9 of Fig. 10.

Referring now to Fig. 9 the pilot valve housing 225 is further provided with a pressure chamber 246 adapted to receive operating fluid under pressure. A pilot disc 247 is disposed in the pressure chamber 246 and engages a seat member 248 which forms a closure for the open end of the pressure chamber 246. The seat 248 is secured to the housing 225 by a plurality of countersunk screws 249.

A fluid distribution base 255 is secured to the pilot valve housing 225 by a plurality of screws 256, a gasket 257 being interposed between the base member 245 and the pilot valve housing 225 to provide a fluid-tight seal therebetween. Operating fluid under pressure is supplied to the pressure chamber 246 of the pilot valve G through a conduit 258 (Fig. 8) one end of which is connected by a conventional fitting 259 with the stem of the pipe-T 207 and the opposite end of which is connected by a conventional fitting 260 with a passage 261 (Fig. 9) in the base member 255. The gasket 257 has an aperture 262 aligned with the passage 261 and the housing 225 has a passage 263 aligned with said aperture. The passage 263 discharges into a chamber 264 having a threaded opening 265 in which is mounted a plug 266 having a strainer 267 through which the liquid must pass before it can enter a passage 268 communicating directly with the pressure chamber 246. It will be clear from the foregoing that the pressure chamber 246 contains operating fluid under substantially the same unit pressure as that prevailing in the inlet opening 46 of the power operated check valve B by virtue of the connection of the conduit 258 with the conduit 209 through the pipe-T 207.

The pilot drive shaft 244 extends through an opening 271 in the pilot valve housing 225 and projects into the pressure chamber 246. The end of the pilot drive shaft 244 adjacent the pilot disc 247 carries a drive washer 272 provided with pins 273 which project into recesses 274 (Fig. 13) provided in one face of the pilot disc 247, whereby to transmit a drive from the drive washer 272 to the pilot disc 247. A washer 276 disposed at the end of the pressure chamber 246 opposite the seat 248 provides a bearing for one end of the pilot drive shaft 244, and the opposite end of said shaft is journalled in a bore 277 formed in a boss 278 on the housing 225. Packing material 279 is disposed in the opening 271 and surrounds the shaft 244, and a gland 280 compresses said packing into sealing engagement with said shaft to prevent leakage of operating fluid from the pressure chamber 246 into the chamber 230 containing the pilot pinion 243 and the rod 234.

The porting of the pilot disc 247 is best illustrated in Figs. 13 and 14. It will be observed that two pressure ports 285 and 286 extend completely through the pilot disc 247 and that a U-shaped exhaust port 287 is disposed intermediate the pressure ports 285 and 286. One leg 288 of the U-shaped exhaust port 287 is disposed on the axis of the disc 247 and its other leg 289 is located the same distance from the axis of said disc as the ports 285 and 286, but on a radius at an angle of 60° from each of said pressure ports.

The pilot seat 248 is shown in detail in Fig. 15 and is provided with an axial port 288ª that constantly registers with the axial leg 288 of the exhaust port 287 of the pilot disc 247. The seat 248 is further provided with ports 285ª and 286ª angularly spaced 60° apart and radially spaced from the port 288ª the same distance that the pressure ports 285 and 286 are spaced from the axis of the pilot disc 247, so that the pressure port 285 and the leg 289 of the U-shaped exhaust port 287 can alternately register with the port 285ª, or the pressure port 286 and the leg 289 can alternately register with the port 286ª in the two operative positions of the pilot disc 247. The seat 248 also has holes 249ª through which the screws 249 extend.

The gasket 257 (Fig. 16) has ports 285ᵇ, 286ᵇ, and 288ᵇ normally aligned with the ports 285ª, 286ª and 288ª, respectively, of the seat 248. The gasket 257 also has holes 256ª through which the screws 256 extend.

The base member 255 (Fig. 12) has an axial passageway 288ᶜ aligned with the ports 288ª and 288ᵇ. The passageway 288ᶜ includes an outer enlarged threaded opening 291 having a conventional elbow fitting 292 mounted therein and to which one end of a drain tube 293 is secured. The opposite end of the drain tube 293 may be open to the atmosphere, or connected with a suitable waste pipe (not shown), as desired.

The base member 255 also has a passageway 285ᶜ (Fig. 12) adapted to be aligned with the ports 285ª and 285ᵇ, which includes a radial portion 294 terminating in an enlarged threaded opening 295 in which is mounted a conventional elbow fitting 296 having one end of the conduit 153 connected therewith, the opposite end of said conduit being connected to the fitting 152 on the bleeder valve E, as previously explained.

The base member 255 is still further provided with a passageway 286ᶜ adapted to be aligned with the ports 286ª and 286ᵇ which includes a radial portion 297 terminating in an enlarged threaded opening 298 in which is mounted a conventional elbow fitting 299 having one end of a conduit 300 connected therewith, the opposite end of said conduit being connected by a conventional fitting 301 (Figs. 1, 2 and 5) with the boss 55ª on the cover 55 of the power operated check valve B. Communication between the conduit 300 and the diaphragm chamber 65 of the valve B is established by the passageway 89 (Fig. 5) previously described.

It will be understood that the check valves B and D are line size, i. e., the same size as the pipes X—Y, and that the vacuum relief valve C and the bleeder valve E are full line size on ¾ to 2-inch backflow prevention units and that on units larger than two-inch size, the vacuum relief valve C and the bleeder valve E will be at least ¼ line size in area, but not less than two inches.

Fig. 1 shows the bleeder valve E in substantially the same horizontal plane as the check valves B and D. However, in order to facilitate graphic illustration of the mode of operation of the backflow prevention unit 1, the valve E has been schematically drawn in a plane lying below the check valves B and D in Figs. 17 to 20, inclusive.

Assuming now, that the backflow prevention unit 1 has been properly installed between the water supply pipe or main X and the consumer's property pipe or main Y, and further assuming that the gate valves A and H have been manually opened and that a normal flow of water is occurring through the pipe line X—Y, the various valves B, C, D and E will assume the relative relations diagrammatically illustrated in Fig. 17, and the pressure-responsive device F and the pilot disc 247 will assume the corresponding position indicated in said figure. Thus, the power operated check valve B and the automatic check valve D are both wide open. The power operated check valve B is open for the reason that the pressure in the inlet chamber 46 thereof is transmitted through conduit 209 to chamber 181 of the pressure-responsive device F, and since this pressure is substantially greater than that in the outlet chamber 96 of the valve D and transmitted through conduit 202 to chamber 180 of said pressure-responsive device, the effect of the differential pressure is to flex the diaphragms 173 and 175 of said pressure-responsive device toward the right, as illustrated. With the diaphragms 173 and 175 in the position shown, the pilot disc 247 will have been actuated by the rod 234, pinion 243 and shaft 244 so that said pilot disc is positioned relative to the seat 248 with the exhaust port 287 thereof in registration with the seat port 286ª, as will be understood from Figs. 13 and 15, thereby permitting the exhaust of spent operating fluid from the diaphragm chamber 65 of the check valve B through the conduits 300 and 293, the pressure of the water against the under side of the valve disc 75 raising said disc from its seat and flexing the diaphragm 62 upwardly to force spent operating fluid from the diaphragm chamber 65 while at the same time permitting the flow of water through the valve B. On the other hand, the automatic pressure-responsive check valve D is open for the reason that the pressure in the inlet chamber 95 thereof is substantially greater than that in its outlet chamber 96, whereby the member 105 is raised by the pressure in the inlet chamber 95 and the diaphragm 92 is flexed upwardly to permit free flow through the valve D, the spent operating fluid in the diaphragm chamber 113 being forced out of said chamber by the upward flexing of the diaphragm so that it is discharged through at least the conduit 116 into the outlet chamber 96.

Simultaneous with the positioning of the pilot disc 247 in a position to permit opening of the power operated check valve B, the pressure port 285 of said pilot disc is aligned with the port seat 285ª, as will be understood from Figs. 13 and 15, so that operating fluid under pressure can flow from the pressure chamber 246 of the pilot valve through the conduit 153 to the diaphragm chamber of the bleeder valve E to close said valve (if the valve is open for any reason) or to maintain the valve E closed drip-tight. The vacuum breaker valve C, of course, is closed drip-tight due to the fact that the line pressure exceeds atmospheric pressure. In other words, during the normal flow through the backflow prevention unit 1, the check valves B and D are wide open, and the bleeder valve E and the vacuum breaker valve C are closed drip-tight.

It will be noted that when the diaphragms 173 and 175 are flexed toward the right, the packing ring 194 (Figs. 10 and 17) if used, engages the annular seat 193 of the housing section 165 to form a tight seal therewith. So long as the pressure in the chamber 181 is in excess of that in the chamber 180, this seal will be maintained. If the diaphragms 173 and 175 should both fail for any reason, such seal will prevent the passage of fluid from the chamber 181 into the chamber 180, so that no fluid can by-pass the pressure-responsive device F from the inlet side of the unit to the outlet side of the unit, as previously explained herein. More important, however, is the cooperation of the packing ring 197 with the seat 196 to provide a similar seal in the event that the pressure in the chamber 180 exceeds that in the chamber 181 and both diaphragms 173 and 175 fail for any reason. In the latter situation, the seal provided by the packing ring 197 will prevent by-passing of possibly contaminated water around the check valves B and D from the pipe line Y into the main X through the conduits 202 and 209.

Figure 18:
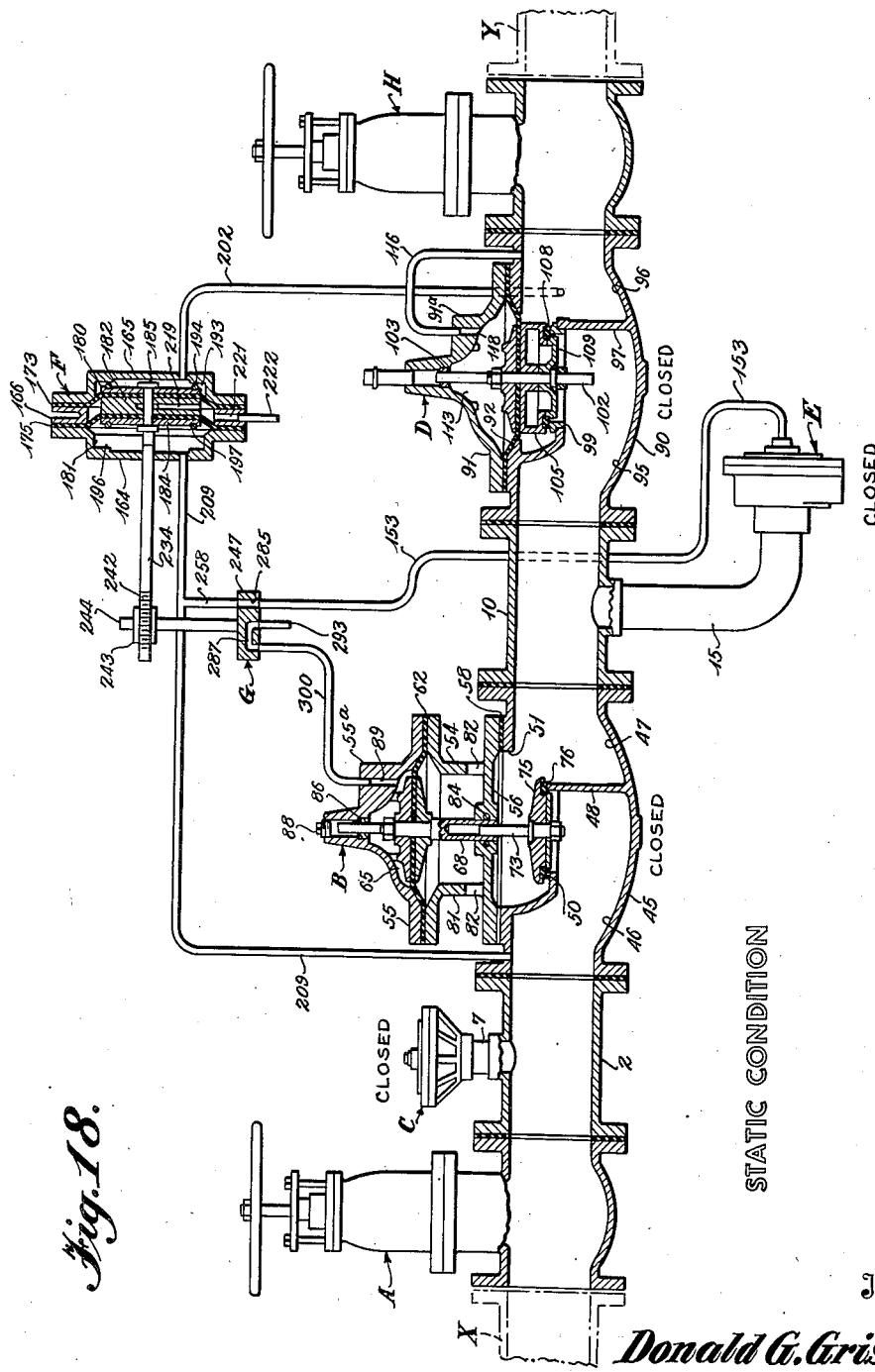
Fig. 18 is a diagrammatic view similar to Fig. 17 but illustrating the parts in the positions they assume during a static line condition.

Assuming now that a substantially static condition arises in the pipe line X—Y, the position of pilot disc 247 will remain unchanged and the vacuum breaker valve C and the bleeder valve E will remain closed, as indicated in Fig. 18. However, the disc 75 of the power operated check valve B will seat itself by gravity independently of the position of the diaphragm 62 and valve stem section 68 and prevent all return flow through the valve B; and the automatic pressure-responsive check valve D will be positively closed due to weight of the stem 102, member 105, etc., and the differential pressure effective upon the diaphragm 92 through at least the conduit 116. It is to be noted that in the event that the pressure in the line X—Y tends to equalize at the inlet and outlet of the unit 1, both check valves B and D close immediately and independently of the control means F—G, and before any backflow can occur through said unit.

Figure 19:
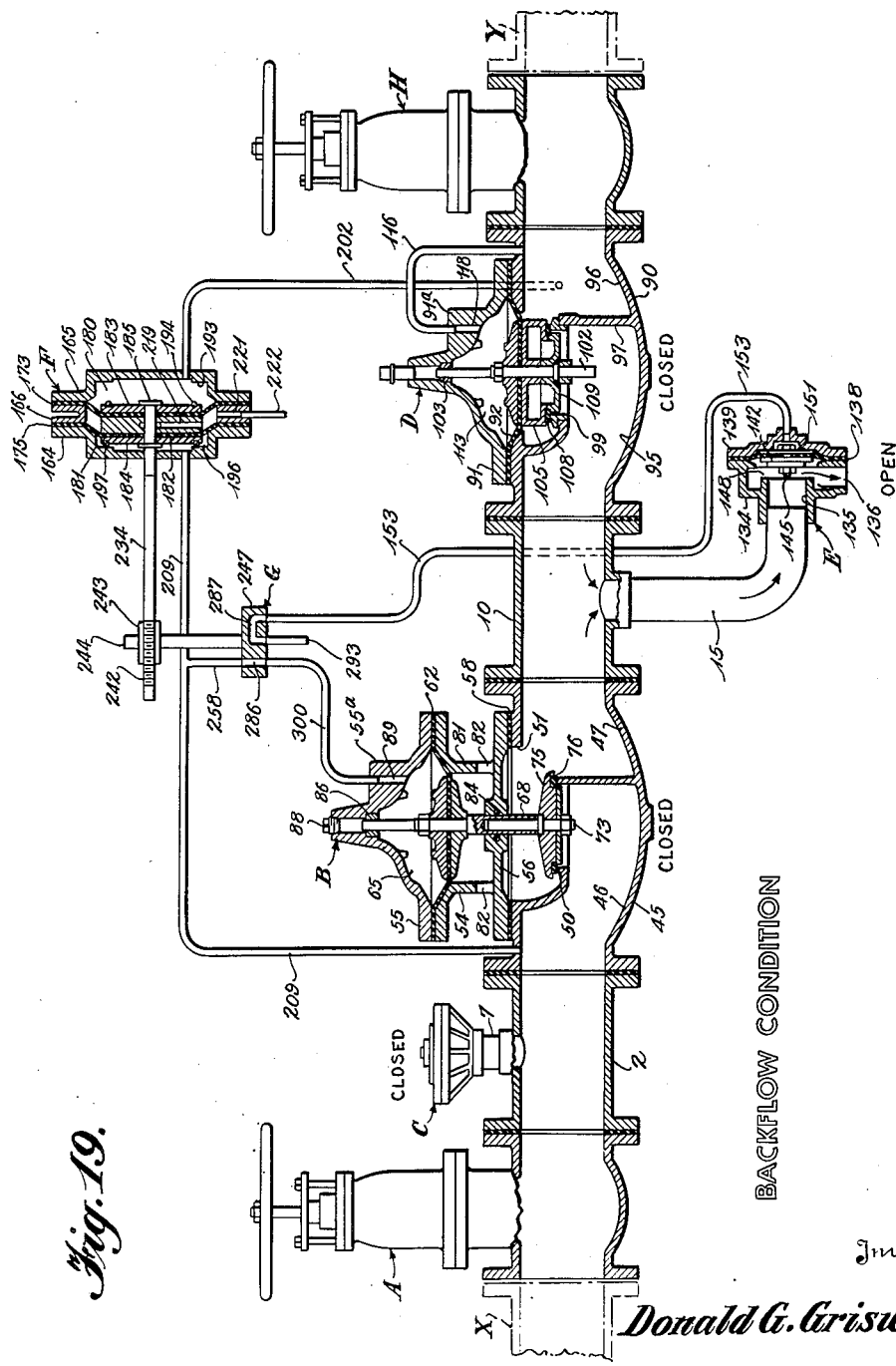
Fig. 19 is a diagrammatic view similar to Fig. 17 but showing the parts of the unit in the position they assume when a backflow condition arises in the line.

Assuming now that the pressure in the supply main X drops to a value below that of the pressure in the service pipe Y, due to sudden demands by other consumers on the supply main X, or for other reasons, the check valves B and D will have been automatically closed due to the preceding static condition; the vacuum breaker valve C will remain closed; and the diaphragms 173 and 175 of the pressure-responsive device F will be flexed toward the left by the reverse pressure conditions, thereby rotating the disc 247 of the pilot valve G through an angle of 60° to effect opening of the bleeder valve E and to simultaneously effect positive closing of the check valve D as distinguished from gravity closing of said valve. Thus, as illustrated in Figure 19, when the pressure in the chamber 181 of the pressure-responsive device F is less than that in the chamber 180 of said device, the diaphragms 173 and 175 are flexed toward the left, causing the rods 185 and 234 to be shifted bodily to the left, to effect rotation of the pilot disc 247 through an angle of about 60° clockwise, as viewed in Fig. 13, to position said pilot disc to admit operating fluid under pressure into the diaphragm chamber 65 of the power operated check valve B and to simultaneously exhaust spent operating fluid from the diaphragm chamber 151 of the bleeder valve E. The foregoing actuation of the pilot disc 247 causes the pressure port 286 of the pilot disc 247 to register with the port 286ª in the seat 248, as will be apparent from Figs. 13 and 15, so that operating fluid under pressure flows from the pressure chamber 246 of the pilot valve, through the conduit 300 to the diaphragm chamber 65 of the valve B. Simultaneous with the registration of the ports 286 and 286ª, the exhaust port 287 of the pilot disc 247 registers with the port 285ª in the seat 248. This opens the diaphragm chamber 151 of the bleeder valve E to the atmosphere through the conduits 153 and 293, and spent operating fluid is then exhausted from said diaphragm chamber so that the bleeder valve E opens to effect draining of the liquid in the pipe section 10 between the check valves B and D, thereby avoiding all possibility of backflow through the unit 1, even in the event that the check valve D should leak for any reason. Leakage of the check valve D would be revealed by continued flow or dripping of water from the bleeder valve E while said bleeder valve is open.

The opening of the bleeder valve E provides visible evidence of a backflow condition, and affords the essential "break to atmosphere."

If we assume now, that line conditions become worse and that a vacuum condition is created in the pipe line X—Y, that is, a condition in the pipe X wherein the pressure is less than atmospheric, back-siphonage which might otherwise be caused by such vacuum condition is positively prevented by the opening of the vacuum breaker valve C. As has been previously explained, this valve immediately opens when the pressure in the pipe X is less than the atmospheric pressure acting upon the exposed side of the diaphragm 26. The line pressure normally keeps the vacuum breaker valve C closed, but when the pressure drops below atmospheric, atmospheric pressure on the outer side of the diaphragm 26 flexes the diaphragm upwardly, thereby forcing operating fluid from the chamber 41 through the passage 42 (Fig. 3). The exhaust of operating fluid is also facilitated by the siphon action produced in the passage 42 by the air rushing in past the lower extremity of the shank 39 which is disposed well below the level of the seat 32 even when the valve C is wide open. Upward flexing of the diaphragm 26 results in raising the disc 34 from its seat, and thus forcing the valve C to open. The vacuum breaker valve C will remain open until the water pressure in the pipe X is restored and then it closes automatically. As the water pressure is restored in the pipe X, the air in said pipe ahead of the check valve B will be displaced and forced out of said pipe through the vacuum breaker valve C without causing closing of said valve because the air will flow through the valve C without building up pressure in the diaphragm chamber 41 sufficient to effect closing of said valve. However, when the water begins to flow through the valve C, a substantial frictional resistance to flow is offered so that substantial hydraulic pressure is developed in the inlet chamber 22 and inasmuch as the shank 39 extends a substantial distance into the opening of the seat 31, a portion of the water is forced into the passageway 42 and thence into the diaphragm chamber 41 to effect positive and quiet seating of the valve disc 34 against the pressure of the water flowing through the seat 31. It is to be understood that sufficient water to thoroughly flush the valve C flows through said valve before the line pressure is high enough to actuate the pressure-responsive device F to operate the pilot G and permit opening of the power operated check valve B, as under normal flow conditions.

Of course, the creation of a vacuum condition in the pipe X will have resulted in a pressure drop in the chamber 181 of the pressure-responsive device F, so that the then predominating pressure is in the pipe Y and, hence, in the chamber 180, whereby the diaphragms 173 and 175 remain flexed toward the left following the backflow condition, the bleeder valve E being open at such time to prevent any flow or siphoning of the water through the backflow unit I. Thus, the unit is so controlled that the supply pipe X is not only vented to the atmosphere to break any vacuum condition formed therein, but the pipe section 10 is simultaneously drained to eliminate any water that might possibly be back-siphoned through the valve B into the pipe X.

After the vacuum breaker valve C has been flushed and closed, as aforedescribed, the pressure in the unit I on the inlet side of the check valve B will further build up and be communicated through conduit 209 to the chamber 181 of the pressure-responsive device F to produce flexing of the diaphragms 173 and 175 to the right, and rotation of the pilot disc 247 toward its original position providing for opening of the check valve B and closing of the bleeder valve E. However, it will be understood that the operation of the control means Z is such that sufficient water will flow through the check valve B, pipe section 10, and the valve E to flush the same thoroughly before enough pressure is built up to effect closing of the valve E through the operation of the pilot valve G. After the bleeder valve E has closed, pressure will build up in the inlet chamber 95 of the automatic pressure-responsive check valve D until it exceeds the pressure in the outlet chamber 96 of said valve, whereupon said valve will open automatically to permit flow of water therethrough and the unit I will then operate as under normal flow conditions.

Thus, it will be clear that the backflow prevention unit I is fully automatic in its operation and that the check valve B and the bleeder valve E are controlled in accordance with the differential pressure across said unit. Should it be desired to have the control device F operate only after a predetermined excess of pressure is attained on the service side of the unit, a suitable spring S (Fig. 10) may be inserted between the disc 235 and the adjacent end of the stem 185. The advantage of such spring would be to avoid the waste of water due to frequent bleeding of a unit installed in a line which is subject to sudden demands that cause the supply main pressure to momentarily drop slightly below the service main pressure.

Fig. 21 somewhat diagrammatically illustrates a modified form of backflow prevention unit I$^a$, which differs from that previously described in that it includes two power operated check valves instead of one power operated check valve and one automatic check valve. Thus, the unit I$^a$ includes a conventional, manually operated gate or shut-off valve A', an automatic vacuum breaker valve C', a power operated check valve B', a bleeder valve E', a power operated check valve D' and a manually operated conventional gate or shut-off valve H'. The power operated check valves B' and D' are each identical to the power operated check valve B, previously described in detail, but are arranged so that both are governed by a control device Z', which includes a pressure-responsive device F' and a pilot valve G', the control device Z' being identical to the control device Z, previously described in detail.

The interconnection of the pressure-responsive device F' and the pilot valve G' with the unit I$^a$ is the same as that in the unit I, that is to say, a conduit 209$^a$ connects the inlet of the check valve B' with the pressure chamber 181$^a$ of the pressure-responsive device F' and a conduit 202$^a$ connects the outlet chamber of the check valve D' with the pressure chamber 180$^a$ of said pressure-responsive device; and a conduit 153$^a$ connects the pilot valve G' with the diaphragm chamber of the bleeder valve E'. However, the connections between the pilot valve G' and the check valves are slightly different. Thus, a conduit 300$^a$ leads from the pilot valve G' and is connected to a conduit 300$^b$ communicating at its respective ends with the diaphragm chambers of the check valves B' and D'. Hence, the check valves B' and D' will open simultaneously and close simultaneously in accordance with the pressure differential across said check valves.

Fig. 21 illustrates the unit with the operative parts in the position that they assume during normal flow conditions in the pipe line. Thus, the diaphragms 173ª and 175ª of the pressure-responsive device F' are flexed toward the right causing the rods 185ª and 234ª to rotate the pilot pinion 243ª, the pilot shaft 244ª and the pilot disc 247ª to the position they occupy during normal flow through the unit 1ª. Accordingly, the port 285' of the pilot disc 247ª is positioned so that operating fluid passes through the conduit 153ª to the diaphragm chamber of the bleeder valve E' to maintain said valve closed. The vacuum breaker valve C', of course, is automatically closed by line pressure. The exhaust port 287' of the pilot disc 247ª is positioned to exhaust spent operating fluid from the diaphragm chambers of the check valves B' and D' through the conduits 300ᵇ, 300ª and the pilot drain conduit 293ª, so that both check valves B' and D' are wide open.

It will be understood that the operation of the unit 1ª is the same as that of the unit 1 during static, backflow and vacuum line conditions, except that both check valves B' and D' will close by gravity, regardless of the position of the pilot disc 247ª, when the pressure at the inlet side of the unit is approximately the same as that at the outlet side of said unit.

Fig. 22 illustrates a further embodiment of the invention incorporating two power operated check valves as in Fig. 21, but including novel means interposed between the pilot valve and the power operated check valves for effecting quick opening and closing of the power operated check valves. Thus, a backflow prevention unit identified by the numeral 1ᵇ includes a manually operable shut-off valve A", a power operated check valve B", an automatic vacuum breaker valve C", a second power operated check valve D", a bleeder valve E" and a manually operable shut-off valve H". The check valves B" and D" are identical to the check valve B. The unit 1ᵇ also includes a control device Z" comprising a pressure-responsive device F", and a pilot valve G", all similar to the pressure-responsive device Z and its components F and G previously described in detail. The control means further includes conventional diaphragm valves J and K interposed between the pilot valve G" and the check valves B" and D" and respectively serving as operating fluid exhaust and supply control valves for said check valves. Thus, the diaphragm chamber 65ᵇ of the power operated check valve B" and the diaphragm chamber 65ᶜ of the power operated check valve D" are interconnected by a pipe 310. The pipe 310 has one end of a branch pipe 311 connected thereto and the opposite end of said branch pipe is connected to a pipe 312 which interconnects the valves J and K. A pipe 313 connects the outlet 47ᶜ of the check valve D" with the inlet side of the supply control valve K. A short length of pipe 314 is connected with the outlet side of the exhaust control valve J and serves as a drain for spent operating fluid from the check valves B" and D", as will appear presently.

The bleeder valve E" is (but need not be) of a different type from the valve E, but includes essentially the same elements. Thus, the valve E" has an inlet 135ᵇ and an outlet 136ᵇ, a seat 148ᵇ, a valve disc 142ᵇ secured to a diaphragm 138ᵇ and a pressure chamber 151ᵇ formed in a cover 139ᵇ above said diaphragm.

The connections between the pilot valve G" and the check valves and bleeder valve of the unit 1ᵇ differ from that of the unit 1 in that the conduit 153 is replaced by a conduit 153ᵇ which is branched to include a portion 153ᶜ communicating with the diaphragm chamber 151ᵇ of the bleeder valve E" and a portion 153ᵈ communicating with the diaphragm chamber d of the supply control valve K. The conduit 300 is replaced by a conduit 300ᵈ which communicates with the diaphragm d' of the exhaust control valve J. A conduit 209ᵇ connects the inlet chamber 46ᵇ of the check valve B" with the pressure chamber 181ᵇ of the pressure-responsive device F" and a conduit 202ᵇ connects the outlet chamber 47ᶜ of the check valve D" with the pressure chamber 180ᵇ of said pressure-responsive device.

The operative parts of the unit 1ᵇ are shown in the position they assume during normal flow condition. Thus, the diaphragms 173ᵇ and 175ᵇ of the pressure-responsive device F" are flexed toward the right and the rods 185ᵇ and 234ᵇ rotate the pilot pinion 243ᵇ and the pilot shaft 244ᵇ to position the pilot disc 247ᵇ in the position it assumes during normal operation of the unit. Accordingly, the pressure port 285" of the pilot disc 247ᵇ is positioned so that operating fluid under pressure is effective through the branch conduits 153ᶜ and 153ᵈ to maintain the bleeder valve E" and the supply control valve K, respectively, closed. At the same time the exhaust port 287" of the pilot disc 247ᵇ establishes communication between the conduits 300ᵈ and the drain conduit 293ᵇ of the pilot valve G" to exhaust spent operating fluid from the diaphragm chamber d' of the exhaust control valve J.

Attention is invited at this point to the fact that the pressure and exhaust ports of the pilot disc 247ᵇ are relatively small compared to the size of the valves J and K and the conduits interconnecting these valves with the check valves B" and D". Hence, the check valves B" and D" will open and close more quickly under the control of the exhaust control valve J and supply control valve K than they could when arranged so that the operating fluid must pass through the ports of the pilot disc 247ᵇ, and particularly if the valves B" and D" are large. Thus, in one operative construction the two pressure ports and the exhaust port of the pilot disc are $\frac{1}{16}$ of an inch in diameter, and the auxiliary or control valves J and K are ⅜ inch valves. It will also be noted that the supply of operating fluid under pressure for the check valves B" and D" is taken from the service or consumer's side of the unit through the conduit 313. Hence, the importance of constructing the check valves B" and D" to include the vent passages 82ᵇ and 82ᶜ, respectively, to prevent leakage between their respective diaphragm chambers 65ᵇ and 65ᶜ and outlet chambers 47ᵇ and 47ᶜ to prevent by-passing of possibly contaminated water through the unit from the consumer's side of the unit, becomes apparent.

The principles of operation of the unit 1ᵇ are essentially the same as that of the unit 1ª, except that the exhaust and admission of operating fluid from the diaphragm chambers 65ᵇ and 65ᶜ of the power operated check valves B" and D" occur, respectively, through the exhaust valve J and the supply valve K under the control of the pilot valve G", instead of being admitted and exhausted through the ports of the pilot disc 247ᵇ. However, during normal flow conditions, the supply control valve K is closed, as previously explained; and the exhaust control valve J is open so that spent operating fluid is quickly exhausted through the pipes 310, 311 and 314. It will be understood that under backflow conditions, the exhaust control valve J will be closed and the supply control valve K and the bleeder valve E will be simultaneously opened. The opening of the supply control valve K will admit operating fluid under pressure into the diaphragm chambers 65$^b$ and 65$^c$ of the check valves B'' and D'', respectively, through the pipes 312, 311 and 310 to effect downward movement of the valve stems 68$^b$ and 68$^c$ thereof to maintain the respective valve discs 75$^b$ and 75$^c$ positively seated to prevent all flow through the unit 1$^b$.

Fig. 23 illustrates another form of backflow prevention unit 1$^c$ which is similar to the unit 1, but includes means interposed between the power operated check valve and pilot valve for effecting quick opening and closing of said check valve. Thus, the unit 1$^c$ includes a manually operable shut-off valve A''', an automatic vacuum breaker valve C''', a power operated check valve B''', a bleeder valve E''', an automatic pressure-responsive check valve D''' and a manually operable shut-off valve H'''. The control means for the valves B''', D''' and E''' includes a control unit Z''', comprising a pressure-responsive device F''' and a pilot valve G''', and an exhaust control valve J' and a supply control valve K' controlled by said pilot valve. Connection between the pilot valve G''' and the valve J' is effected through a conduit 300$^e$ and communication between said pilot valve and the bleeder valve E''' and the supply control valve K' is effected through branch conduits 153$^e$ and 153$^f$, respectively. A pipe 313$^a$ connects the outlet chamber 47$^e$ of the check valve D''' with the inlet of the supply valve K'. A pipe 312$^a$ interconnects the valves K' and J' and a pipe 311$^a$ establishes communication between the pipe 312$^a$ and the diaphragm chamber 65$^d$ of the check valve B'''. A pipe 314$^a$ connected with the outlet side of the exhaust valve J' serves as a drain. A conduit 209$^c$ connects the inlet chamber 46$^d$ of the check valve B''' with the pressure chamber 181$^c$ of the pressure-responsive device F''', and a conduit 202$^c$ connects the outlet chamber 47$^d$ of the check valve D''' with the pressure chamber 180$^c$ of said pressure-responsive device.

Fig. 23 illustrates the parts of the unit 1$^c$ in the position they assume during normal flow condition, that is, the exhaust control valve J' has the diaphragm chamber thereof vented to the atmosphere through the conduit 300$^e$ and a drain conduit 293$^c$ of the pilot valve G''' so that spent operating fluid is exhausted from the diaphragm chamber 65$^d$ of the check valve D''' through the pipes 311$^a$, 312$^a$ and 314$^a$, thereby enabling said check valve to quickly open wide. At the same time, operating fluid under pressure is effective through the conduit 153$^e$ to maintain the bleeder valve E''' closed and the conduit 153$^f$ to maintain the supply control valve K' closed. The check valve D''' is automatically opened due to the differential pressure between the inlet chamber 46$^e$ and the outlet chamber 47$^d$ thereof, the check valve D''' being identical in construction and operation to the check valve D previously described herein. The operation of the unit 1$^c$ under static, backflow and vacuum conditions, is exactly the same as the unit 1 except through the modification in quick closing and opening action of the valve B''' effected by the addition of the auxiliary control valves J' and K'.

The vacuum breaker valve C is claimed per se in my application Serial No. 595,005 filed of even date herewith, which issued as Patent 2,511,435 on June 13, 1950; and the check valve D is claimed per se in my application Serial No. 595,004, also filed of even date herewith.

While certain types of check valves, vacuum breaker valves and bleeder valves have been illustrated herein, it will be understood that changes may be made in the details of construction thereof without departing from the principles of the invention. It will also be understood that changes may be made in the details of construction of the automatic control means associated with the several backflow protection units disclosed herein without altering their principles of operation. Hence, it is contemplated that various changes in construction and arrangement of the various elements of the backflow prevention units may be made without departing from the spirit of the invention or the scope of the annexed claims.

What I claim is:

1. A backflow prevention unit adapted to be connected between a supply main and a service pipe, comprising: two check valves, the check valve nearest the supply end of said unit at least being fluid pressure operated; conduit means connecting said check valves in series; a fluid pressure operated bleeder valve connected with said conduit means for effecting draining thereof; a pilot valve controlling the operation of said bleeder valve and at least the fluid pressure operated check valve nearest the supply end of said unit; and pressure-responsive means for actuating said pilot valve arranged so that it is responsive to the differential pressure across said check valves, said pilot valve being arranged to be actuated to control the flow of operating fluid to simultaneously effect positive closing of the fluid pressure operated check valve by admitting operating fluid thereinto and opening of said bleeder valve by exhausting operating fluid therefrom when the pressure on the service side of said unit is greater than the pressure on the supply side of said unit.

2. A backflow prevention unit adapted to be connected between a supply main and a service pipe, comprising: two check valves, one of said check valves having an inlet adapted to be subjected to the pressure in said supply main and the other of said check valves having an outlet adapted to be subjected to the pressure in said service main; conduit means connecting the outlet of said one check valve with the inlet of said other check valve, said one check valve at least being fluid pressure operated and including a valve disc adapted to seat by gravity when the pressure in the inlet thereof is less than that in the outlet thereof and means operated by fluid under pressure for effecting positive seat of said valve disc regardless of the relative pressure conditions in the inlet and outlet of said one valve; a fluid pressure operated bleeder valve connected with said conduit means for effecting draining thereof; a pressure-responsive device subject to the differential pressure across said check valves; and a pilot valve actuated by said pressure-responsive device arranged to control the flow of operating fluid to effect positive closing of at least said one fluid pressure operated check valve by admitting operating fluid thereinto and to simultaneously effect opening of said bleeder valve by exhausting operating fluid therefrom when the pressure at the inlet side of said one check valve is greater than the pressure at the outlet side of said other check valve.

3. A backflow prevention unit adapted to be connected between a supply main and a service pipe, comprising: a fluid pressure operated check valve having an inlet adapted to be subjected to the pressure in said supply main; an automatic pressure-responsive check valve having an outlet adapted to be subjected to the pressure in said service main; conduit means interconnecting the outlet of said fluid pressure operated check valve with the inlet of said automatic check valve; a fluid pressure operated bleeder valve connected with said conduit means for effecting draining thereof; and means arranged to simultaneously supply operating fluid to said fluid pressure operated check valve to effect positive closing thereof and to exhaust spent operating fluid from said bleeder valve to effect opening thereof when the pressure at the service side of said unit is greater than the pressure at the supply side of said unit.

4. A backflow protection device adapted to be connected between a supply main and a service pipe, comprising: a fluid pressure operated check valve having an inlet and an outlet, said inlet being adapted to be connected with said remain, a seat between said inlet and outlet, a valve disc engageable with said seat to prevent flow between said inlet and said outlet, a valve stem section connected with said disc, a second valve stem section telescopically engaging said first-mentioned valve stem section, a diaphragm operatively connected with said second valve stem section and a diaphragm pressure chamber at one side of said diaphragm, whereby said valve disc can seat by gravity to prevent flow through said check valve regardless of the position of said diaphragm; an automatic hydraulically operated check valve; a conduit section connecting the outlet of said fluid pressure operated check valve with the inlet side of said automatic check valve, said automatic check valve being arranged to close when the pressure in the outlet thereof exceeds the pressure in the inlet thereof; a fluid pressure operated bleeder valve communicating with said conduit section; a pilot valve arranged to control said fluid pressure operated check valve and said fluid pressure operated bleeder valve so that when one of said valves is open, the other is closed; and pressure-responsive means for actuating said pilot valve arranged to be operated in accordance with the pressure differential across said check valves, whereby said bleeder valve is opened and said fluid pressure operated check valve is closed when the pressure at the supply end of said unit is less than the pressure at the service end of said unit, and vice versa.

5. A backflow prevention unit adapted to be connected between a supply main and a service pipe, comprising: two fluid pressure operated check valves, one of said check valves having an inlet adapted to be subjected to the pressure in said supply main and the other of said check valves having an outlet adapted to be subjected to the pressure in said service main; conduit means connecting the outlet of said one check valve with the inlet of said other check valve; a fluid pressure operated bleeder valve connected with said conduit means for effecting draining thereof; a pressure-responsive device subject to the differential pressure across said check valves; and a pilot valve actuated by said pressure-responsive device arranged to effect positive closing of said fluid pressure operated check valves and to simultaneously effect opening of said bleeder valve when the pressure at the inlet side of said one check valve is less than the pressure at the outlet side of said other check valve.

6. A backflow prevention unit adapted to be connected between a supply main and a service pipe, comprising: two fluid pressure operated check valves, each of said check valves including a valve stem consisting of two telescoping sections, a diaphragm connected to one of said valve stem sections and a valve disc connected to the other of said valve stem sections and normally tending to seat by gravity to cut off flow through the valve regardless of the position of the diaphragm connected to its associated valve stem section, the inlet of one of said check valves being adapted to be subjected to the pressure in said supply main and the outlet of the other of said check valves being adapted to be subjected to the pressure in said service main; conduit means connecting the outlet side of said one check valve with the inlet side of said other check valve; a fluid pressure operated bleeder valve connected to said conduit means for effecting draining thereof; a pressure-responsive device subject to the differential pressure across said check valves; and a pilot valve actuated by said pressure-responsive device arranged to effect positive closing of said check valves and to simultaneously effect opening of said bleeder valve when the pressure at the outlet of said other check valve is greater than the pressure at the inlet of said one check valve, said valve discs being adapted to cut off flow through said check valves by gravity independently of said pressure-responsive device and pilot valve when the pressure at the inlet of said one check valve is approximately equal to the pressure at the outlet of said other check valve.

7. A backflow prevention unit adapted to be connected between a supply main and a service pipe, comprising: a fluid pressure operated check valve having an inlet adapted to be subjected to the pressure of said supply main; an automatic pressure-responsive check valve having an outlet adapted to be subjected to the pressure in said service main; conduit means interconnecting the outlet of said fluid pressure operated check valve with the inlet of said automatic check valve; a fluid pressure operated bleeder valve connected with said conduit means for effecting draining thereof; an automatic vacuum breaker valve communicating with the inlet of said pressure fluid operated check valve at the supply end of said unit adapted to vent said unit to the atmosphere when a vacuum condition occurs on the supply side of said unit; and means arranged to supply operating fluid to said fluid pressure operated check valve to effect positive closing thereof and to simultaneously exhaust operating fluid from said bleeder valve to effect opening thereof when a vacuum condition occurs on the supply side of said unit.

8. A backflow prevention unit adapted to be connected between a supply main and a service pipe, comprising: two fluid pressure operated check valves, one of said check valves having an inlet adapted to be subjected to the pressure in said supply main and the other of said check valves having an outlet adapted to be subjected to the pressure in said service main; conduit means interconnecting the outlet of said one check valve with the inlet of said other check valve; a fluid pressure operated bleeder valve connected with said conduit means for effecting draining thereof;

an automatic vacuum breaker valve communicating with the inlet of said one check valve at the supply end of said unit adapted to vent said unit to the atmosphere when a vacuum condition occurs on the supply side of said unit; and means arranged to supply operating fluid under pressure to both of said check valves to effect positive closing of the same and to simultaneously exhaust operating fluid from said bleeder valve to effect opening of the same when a vacuum condition occurs on the supply side of said unit.

9. A backflow prevention unit adapted to be connected between a supply main and a service pipe, comprising: two check valves, at least the check valve nearest the supply end of said unit being fluid pressure operated; conduit means connecting said check valves in series; a fluid pressure operated bleeder valve connected with said conduit means for effecting draining thereof; a pilot valve controlling the supply of operating fluid to and the exhaust of operating fluid from the respective fluid pressure operated valves; and a pressure-responsive device for actuating said pilot valve arranged so that it is responsive to the differential pressure across said check valves, said pressure-responsive device including a pair of diaphragms, one of which is subjected to the pressure at the supply side of said unit and the other of which is subjected to the pressure at the service side of said unit, and means in said pressure-responsive device arranged to preclude the flow of fluid through said pressure-responsive device around said check valves in the event of failure of said diaphragms.

10. A backflow prevention unit adapted to be connected between a supply main and a service pipe, comprising: two check valves, at least the check valve nearest the supply end of said unit being fluid pressure operated; conduit means connecting said check valves in series; a fluid pressure operated bleeder valve connected with said conduit means at a point between said check valves for effecting draining of said conduit means; a pilot valve controlling the flow of operating fluid to control the operation of said bleeder valve and at least the fluid pressure operated check valve nearest the supply end of said unit, said pilot valve being operable to exhaust operating fluid from said bleeder valve to allow opening thereof while admitting operating fluid to at least said last mentioned check valve to effect closing thereof; and a pressure-responsive device for actuating said pilot valve arranged so that it is responsive to the differential pressure across said check valves, said fluid pressure-responsive device including a pair of diaphragms, one of which is subjected to the pressure at the supply side of said unit and the other of which is subjected to the pressure at the service side of said unit; and means arranged to preclude by-passing of said check valves through said pressure-responsive device in the event of failure of said diaphragms.

11. A backflow prevention unit adapted to be connected between a supply main and a service pipe, comprising: two check valves, at least the check valve nearest the supply end of said unit being fluid pressure operated; conduit means connecting said check valves in series; a fluid pressure operated bleeder valve connected with said conduit means at a point between said check valves for effecting draining of said conduit means; a pilot valve controlling the flow of operating fluid to control the operation of said bleeder valve and at least the fluid pressure operated check valve nearest the supply end of said unit, said pilot valve being operable to exhaust operating fluid from said bleeder valve to allow opening thereof while admitting operating fluid to at least said last mentioned check valve to effect closing thereof; and a pressure-responsive device for actuating said pilot valve arranged so that it is responsive to the differential pressure across said check valves, said pressure-responsive device including a pair of diaphragms, one of which is subjected to the pressure at the supply side of said unit and the other of which is subjected to the pressure at the service side of said unit; and means between said diaphragms for draining leakage past either of said diaphragms to the atmosphere, whereby to preclude by-passing of said leakage around said check valves.

12. A backflow prevention unit adapted to be connected between a supply main and a service pipe, comprising: two check valves, the inlet of one of said check valves being adapted to be subjected to the pressure of said supply main and the outlet of the other of said check valves being adapted to be subjected to the pressure in said service main, at least one of said check valves including means for indicating malfunctioning thereof; conduit means connecting the outlet of said one ckeck valve with the inlet of said other check valve; a fluid pressure operated bleeder valve connected with said conduit means at a point between check valves to effect draining of said conduit means, said bleeder valve including body means containing a chamber for operating fluid; a pressure-responsive device including diaphragm means subjected to said differential pressure across said check valves and means for indicating leakage past and/or failure of said diaphragm means; and a pilot valve actuated by said pressure-responsive device arranged to control at least said bleeder valve and to effect opening thereof by exhausting operating fluid therefrom when the pressure at the outlet of said other check valve is greater than the pressure at the inlet of said one check valve.

13. A backflow prevention unit adapted to be connected between a supply main and a service pipe, comprising: two check valves, the inlet of one of said check valves being adapted to be subjected to the pressure of said supply main and the outlet of the other of said check valves being adapted to be subjected to the pressure in said service main, at least one of said check valves being fluid pressure operated and including means for indicating malfunctioning thereof; conduit means connecting the outlet of said one check valve with the inlet of said other check valve; a fluid pressure operated bleeder valve connected with said conduit means at a point between said check valves to effect draining of said conduit means; a pressure-responsive device subject to said differential pressure across said check valves; and a pilot valve actuated by said pressure-responsive device connected to control the flow of operating fluid to effect positive closing of the fluid pressure operated check valve by admitting operating fluid thereinto and to simultaneously effect opening of said bleeder valve by exhausting operating fluid therefrom when the pressure at the outlet of said other check valve is greater than the pressure at the inlet of said one check valve.

14. A backflow prevention unit adapted to be connected between a supply main and a service pipe, comprising: two check valves, the inlet of one of said check valves being adapted to be subjected to the pressure of said supply main and the outlet of the other of said check valves being adapted to be subjected to the pressure in said service main, at least said one check valve being fluid pressure operated; conduit means connecting the outlet of said one check valve with the inlet of said other check valve; a fluid pressure operated bleeder valve connected with said conduit means at a point between said check valves for effecting draining of said conduit means; a pressure-responsive device including diaphragm means subject to said differential pressure across said check valves and means for indicating leakage past and/or failure of said diaphragm means; and a pilot valve actuated by said pressure-responsive device connected to control the flow of operating fluid to effect positive closing of the fluid pressure operated check valve by admitting operating fluid thereinto and to simultaneously effect opening of said bleeder valve by exhausting operating fluid therefrom when the pressure at the outlet of said other check valve is greater than the pressure at the inlet of said one check valve.

15. A backflow prevention unit adapted to be connected between a supply main and a service pipe, comprising: two check valves, the inlet of one of said check valves being adapted to be subjected to the pressure of said supply main and the outlet of the other of said check valves being adapted to be subjected to the pressure in said service main, at least said one check valve being fluid pressure operated and including means for indicating malfunctioning thereof; conduit means connecting the outlet of said one check valve with the inlet of said other check valve; a fluid pressure operated bleeder valve connected with said conduit means at a point between said check valves to effect draining of said conduit means; a pressure-responsive device including diaphragm means subject to said differential pressure across said check valves and means for indicating leakage past and/or failure of said diaphragm means; and a pilot valve actuated by said pressure-responsive device arranged to control the flow of operating fluid to effect positive closing of the fluid pressure operated check valve by admitting operating fluid thereinto and to simultaneously effect opening of said bleeder valve by exhausting operating fluid therefrom when the pressure at the outlet of said other check valve is greater than the pressure at the inlet of said one check valve.

16. A backflow prevention unit adapted to be connected between a supply main and a service pipe, comprising: two fluid pressure operated check valves, the inlet of one of said check valves being adapted to be subjected to the pressure of said supply main and the outlet of the other of said check valves being adapted to be subjected to the pressure in said service main, each of said check valves including means for indicating malfunctioning thereof; conduit means connecting the outlet of said one check valve with the inlet of said other check valve; a fluid pressure operated bleeder valve connected with said conduit means to effect draining thereof; a pressure-responsive device subject to the differential pressure across said check valves and including means for indicating malfunctioning thereof; and a pilot valve actuated by said pressure-responsive device arranged to effect positive closing of the fluid pressure operated check valves and to simultaneously effect opening of said bleeder valve when the pressure at the outlet of said other check valve is greater than the pressure at the inlet of said one check valve.

17. A backflow prevention unit adapted to be connected between a supply main and a service pipe, comprising: two check valves, the inlet of one of said check valves being adapted to be subjected to the pressure of said supply main and the outlet of the other of said check valves being adapted to be subjected to the pressure in said service main, said one check valve at least being fluid pressure operated and including a valve stem consisting of two telescoping sections, a diaphragm connected to one of said valve stem sections, a valve disc connected to the other of said valve stem sections and normally tending to seat by gravity to cut off flow through the valve regardless of the position of the diaphragm connected to its associated valve stem section, and wall means between said valve disc and the adjacent side of said diaphragm arranged to provide a chamber communicating with the atmosphere for receiving leakage along said valve stem and to receive leakage resulting from the failure of said diaphragm itself and thus indicate that said one check valve has developed a defect; means connecting the outlet of said one check valve with the inlet of said other check valve; a pressure-responsive device subject to the differential pressure across said check valves; and a pilot valve actuated by said pressure-responsive device arranged to effect positive closing of the fluid pressure operated check valve when the pressure at the outlet of said other check valve is greater than the pressure at the inlet of said one check valve, said valve disc being adapted to cut off flow through said one check valve by gravity independently of said pressure-responsive device and pilot valve when the pressure at the inlet of said one check valve is approximately equal to the pressure at the outlet of said other check valve.

18. A backflow prevention unit as defined in claim 17, in which the pressure-responsive device includes diaphragm means subject to the differential pressure across the check valves, and means for indicating leakage past and/or failure of said diaphragm means.

19. A backflow prevention unit as defined in claim 17 in which a fluid pressure operated bleeder valve communicates with the means connecting the two check valves together, and in which the pilot valve is arranged to effect opening of said bleeder valve simultaneously with the closing of the fluid pressure operated check valve.

20. A backflow prevention unit as defined in claim 17, in which a fluid pressure operated bleeder valve communicates with the means connecting the two check valves together, and in which the pilot valve is arranged to effect opening of said bleeder valve simultaneously with the closing of the fluid pressure operated check valve, and in which the pressure-responsive device includes diaphragm means subject to the differential pressure across the check valves and further includes means for indicating leakage past and/or failure of said diaphragm means.

21. A backflow prevention unit adapted to be connected between a supply main and a service pipe, comprising: two fluid pressure operated check valves; a pipe section interconnecting said check valves; a fluid pressure operated bleeder valve connected with said conduit for effecting draining thereof; a pilot valve arranged to simultaneously effect closing of said check valves and opening of said bleeder valve, and vice versa; a pressure-responsive device for actuating said pilot valve, said pressure-responsive device including a housing having diaphragm means therein and pressure chambers on opposite sides of said diaphragm means; conduit means connecting one of said pressure chambers of said pressure-responsive device with the inlet side of the check valve nearest the supply side of said unit; a second conduit means connecting the other pressure chamber of said pressure-responsive device with the outlet side of the check valve nearest the service side of said unit, said pressure-responsive device including means for precluding the flow of fluid through said pressure-responsive device and around said check valves; and means operatively interconnecting said diaphragm means and said pilot valve to effect actuation of said pilot valve in accordance with pressure changes in said chambers of said pressure-responsive device.

22. A backflow prevention unit adapted to be connected between a supply main and a service pipe, comprising: two valves, at least one of which is fluid pressure operated, the inlet of one of said valves being adapted to be subjected to the pressure of said supply main and the outlet of the other of said valves being adapted to be subjected to the pressure in said service main; conduit means connecting the outlet of said one valve with the inlet of said other valve; a fluid pressure operated bleeder valve connected with said conduit means for effecting draining thereof; a pressure-responsive device including a first end section, an intermediate section and a second end section, a first diaphragm interposed between said first end section and said intermediate section, and a second diaphragm interposed between said intermediate section and said second end section, whereby to provide a first pressure chamber between said first end section and said first diaphragm, and a second pressure chamber between said second diaphragm and said second end section; means connecting said press-responsive device with the remainder of said unit so that said first pressure chamber is subject to the pressure at the supply side of said unit and said second pressure chamber is subject to the pressure at the service side of said unit; a rod connected with said diaphragms and extending through one of said end sections; an annular spacer surrounding said rod and disposed in said intermediate section between said first and second diaphragms, said annular spacer including passage means for conducting any leakage along said rod from either said first or second pressure chambers to the outer periphery of said spacer, said intermediate section including passage means for draining such leakage to the atmosphere, whereby to prevent the leakage of fluid from one of said pressure chambers into the other and hence from one side of said unit to the other around said valves; and a pilot valve actuated by said rod arranged to control the flow of operating fluid to effect positive closing of at least one of said two first-mentioned valves by admitting operating fluid thereinto and to simultaneously effect opening of said bleeder valve by exhausting operating fluid therefrom when the pressure at the service end of said unit is greater than the pressure at the supply end of said unit.

23. A backflow prevention unit adapted to be connected between a supply main and a service pipe, comprising: two valves at least one of which is fluid pressure operable, the inlet of one of said valves being adapted to be subjected to the pressure of said supply main and the outlet of the other of said valves being adapted to be subjected to the pressure in said service main; conduit means connecting the outlet of said one valve with the inlet of said other valve; a fluid pressure operated bleeder valve connected with said conduit means for effecting draining thereof; a pressure-responsive device including end sections and an annular intermediate section disposed between said end sections, a diaphragm interposed between said intermediate section and each of said end sections, each of said end sections having the side thereof adjacent its associated diaphragm recessed to provide a pressure chamber adapted to be connected with a source of pressure; means connecting said pressure-responsive device with the remainder of said unit so that one of said pressure chambers is subject to the pressure at the supply side of said unit and the other of said pressure chambers is subject to the pressure at the service side of said unit; fastening members securing said end sections, diaphragms, and intermediate section in assembled relation, said intermediate section including means establishing communication between said fastening members and the atmosphere, whereby any leakage along said fastening members will pass from said pressure chambers to the atmosphere instead of passing from one of said pressure chambers to the other and, hence, from one side of said unit to the other around said valves; a rod; means operatively connecting said rod with said diaphragms; and a pilot valve actuated by said rod arranged to control the flow of operating fluid to effect positive closing of at least one of said two first-mentioned values by admitting operating fluid thereinto and to simultaneously exhaust operating fluid from said bleeder valve to allow opening of said bleeder valve by pressure in said conduit means when the pressure at the service end of said unit is greater than the pressure at the supply end of said unit.

24. A backflow prevention unit adapted to be connected between a supply main and a service pipe, comprising: two check valves; conduit means connecting said check valves in series, at least one of said check valves being fluid pressure operated and having a chamber adapted to receive operating fluid under pressure; and means for effecting quick opening and quick closing of the fluid pressure operated check valve, including a pressure-responsive device arranged to be actuated in accordance with the pressure differential across said check valves, a pilot valve including a ported element arranged to be actuated by said fluid pressure-responsive device, and means between said pilot valve and said check valves having a substantially greater flow capacity than said ported pilot element and controlled by said pilot valve arranged to supply and exhaust operating fluid from the pressure chamber of the fluid pressure operated check valve to control the closing and opening of the fluid pressure operated check valve in accordance with variations of the differential pressure across said unit.

25. A blackflow prevention unit adapted to be connected between a supply main and a service pipe, comprising: two check valves; conduit means interconnecting said check valves, at least one of said check valves being of the diaphragm type and fluid pressure operated; and means for effecting quick opening and quick closing of the fluid pressure operated check valve, including a pressure-responsive device arranged to be actuated in accordance with the pressure differential across said check valves, a pilot valve including a ported element arranged to be actuated by said fluid pressure-responsive device, and a pair of auxiliary control valves having a capacity substantially greater than the ports of said ported pilot element arranged to be controlled by said pilot valve, one of said auxiliary valves being arranged to be open while the other auxiliary valve is closed to control the supply of operating fluid under pressure to the fluid pressure operated check valve to effect quick closing thereof, and said other auxiliary valve being open at the time that said one auxiliary valve is closed to allow the exhaust of spent operating fluid from the fluid pressure operated check valve to permit quick opening thereof.

26. A backflow prevention unit adapted to be connected between a supply main and a service pipe, comprising: two check valves; conduit means interconnecting said check valves, at least one of said check valves being fluid pressure operated and having a chamber for operating fluid; a fluid pressure operated bleeder valve communicating with said conduit means for effecting draining thereof; and means for controlling the opening and closing of said bleeder valve and for effecting corresponding quick closing and quick opening of the fluid pressure operated check valve, said control means including a pressure-responsive device actuable in accordance with the pressure differential across said check valves, a pilot valve arranged to be actuated by said fluid pressure-responsive device, and supply and exhaust control valves for the fluid pressure operated check valve, said pilot valve having a ported element arranged to simultaneously control the supply and exhaust of operating fluid to said bleeder valve and said control valves, each of said control valves having a capacity substantially greater than the ports of said ported pilot element, said supply control valve being adapted to be closed simultaneously with the closing of said bleeder valve and normally opening and closing simultaneously with the opening and closing of said bleeder valve and serving to control the supply of operating fluid under pressure to the pressure chamber of the pressure fluid operated check valve to effect positive closing of said check valve simultaneous with the opening of said bleeder valve, and said exhaust control valve normally being open at the time that said supply control valve and said bleeder valve are closed to allow the exhaust of spent operating fluid from the fluid pressure operated check valve to permit opening of the fluid pressure operated check valve when said bleeder valve is closed.

27. A backflow prevention unit adapted to be connected between a supply main and a service pipe, comprising: two fluid pressure operated check valves; conduit means connecting said check valves in series; and means for effecting quick opening and quick closing of said check valves, including a pressure-responsive device arranged to be actuated in accordance with the pressure differential across said check valves, a pilot valve including a ported element arranged to be actuated by said fluid pressure-responsive device, and a pair of auxiliary control valves having a capacity substantially greater than the ports of said ported pilot element arranged to be controlled by said pilot valve, one of said auxiliary valves being arranged to be open while the other auxiliary valve is closed to control the supply of operating fluid under pressure to said check valves to effect quick closing of said check valves, and said other auxiliary valve being open at the time that said one auxiliary valve is closed to allow the exhaust of spent operating fluid from said check valves to permit quick opening of said check valves.

28. A backflow prevention unit adapted to be connected between a supply main and a service pipe, comprising: two fluid pressure operated check valves each having a pressure chamber for operating fluid; conduit means connecting said check valves in series; and means for effecting quick opening and quick closing of said check valves, including a pressure-responsive device arranged to be actuated in accordance with the pressure differential across said check valves, a pilot valve including a ported element arranged to be actuated by said fluid pressure-responsive device, and supply and exhaust control valves for said check valves each having a capacity substantially greater than the ports of said ported pilot element arranged to be controlled by said pilot valve, tube means connecting said supply and exhaust valves in series and communicating at one end with the service side of said unit, and means communicating with the pressure chambers of both of said check valves and connected to said tube means at a point intermediate said supply and exhaust control valves, said supply valve being adapted to be open while said exhaust valve is closed to control the supply of operating fluid under pressure to said check valves to effect quick closing of said check valves, and said exhaust valve being adapted to be open at the time that said supply valve is closed to allow the exhaust of spent operating fluid from said check valves to permit quick opening of said check valves.

29. A backflow prevention unit adapted to be connected between a supply main and a service pipe, comprising: two fluid pressure operated check valves each having a pressure chamber for operating fluid; conduit means connecting said check valves in series; a fluid pressure operated bleeder valve communicating with said conduit means for effecting draining thereof; and means for controlling the opening and closing of said bleeder valve and for effecting corresponding quick closing and quick opening of said check valves, said control means including a pressure-responsive device actuable in accordance with the pressure differential across said check valves, a pilot valve arranged to be actuated by said fluid pressure-responsive device, and supply and exhaust control valves, said pilot valve having a ported element arranged to simultaneously control the supply and exhaust of operating fluid to said bleeder valve and said control valves, each of said control valves having a capacity substantially greater than the ports of said ported pilot element, said supply control valve being adapted to be closed simultaneously with the closing of said bleeder valve and normally opening and closing simultaneously with the opening and closing of said bleeder valve and serving to control the supply of operating fluid under pressure to the pressure chambers of said check valves to effect the simultaneous closing of said check valves with the opening of said bleeder valve, and said exhaust control valve normally being open at the time that said supply control valve and said bleeder valve are closed to allow the exhaust of spent operating fluid from said check valves to permit opening of said check valves when said bleeder valve is closed.

30. A backflow prevention unit adapted to be connected between a supply main and a service pipe, comprising: two fluid pressure operated check valves each having a pressure chamber for operating fluid; conduit means connecting said check valves in series; a fluid pressure operated bleeder valve communicating with said conduit means for effecting draining thereof and means for controlling the opening and closing of said bleeder valve and for effecting corresponding quick closing and opening of said fluid pressure operated check valves, said control means including a pressure-responsive device actuable in accordance with the pressure differential across said check valves, a pilot valve arranged to be actuated by said fluid pressure-responsive device, and supply and exhaust control valves, said pilot valve having a ported element arranged to simultaneously control the supply and exhaust of operating fluid to said bleeder valve and said control valves, each of said control valves having a capacity substantially greater than the ports of said ported pilot element, tube means connecting said supply and exhaust valves in series and communicating at one end with the service side of said unit, and means communicating with the pressure chambers of both of said check valves and connected to said tube means at a point intermediate said supply and exhaust control valves, said supply control valve being adapted to be closed simultaneously with the closing of said bleeder valve and normally opening and closing simultaneously with the opening and closing of said bleeder valve and serving to control the supply of operating fluid under pressure to the pressure chambers of said check valves to effect the simultaneous closing of said check valves with the opening of said bleeder valve, and said exhaust control valve normally being open at the time that said supply control valve and said bleeder valve are closed to allow the exhaust of spent operating fluid from said check valves to permit opening of said check valves when said bleeder valve is closed.

DONALD G. GRISWOLD.

REFERENCES CITED

The following references are of record in the file of this patent:

UNITED STATES PATENTS

| Number | Name | Date |
|---|---|---|
| 271,761 | Allen | Feb. 6, 1883 |
| 595,061 | Gulland | Dec. 7, 1897 |
| 1,105,991 | Miller | Aug. 4, 1914 |
| 1,302,538 | Gulick | May 6, 1919 |
| 1,755,993 | Kelley | Apr. 22, 1930 |
| 1,901,119 | Putnam | Mar. 14, 1933 |
| 1,960,144 | Entriken | May 22, 1934 |
| 2,001,318 | Spence | May 14, 1935 |
| 2,058,590 | Jefferson | Oct. 27, 1936 |
| 2,146,204 | Dore | Feb. 7, 1939 |
| 2,272,304 | Lohman | Feb. 10, 1942 |
| 2,310,586 | Lohman | Feb. 9, 1943 |
| 2,319,011 | Meredith | May 11, 1943 |
| 2,328,118 | Ahlport | Aug. 31, 1943 |
| 2,381,429 | Bell | Aug. 7, 1945 |
| 2,389,412 | Carlton | Nov. 10, 1945 |